United States Patent
Nishizawa et al.

(10) Patent No.: US 9,587,944 B2
(45) Date of Patent: *Mar. 7, 2017

(54) ANGULAR VELOCITY SENSOR, ELECTRONIC APPARATUS, AND MOVING OBJECT

(71) Applicant: Seiko Epson Corporation, Tokyo (JP)

(72) Inventors: Ryuta Nishizawa, Matsumoto (JP); Keiji Nakagawa, Minowa (JP); Norifumi Shimizu, Matsumoto (JP)

(73) Assignee: Seiko Epson Corporation (JP)

( * ) Notice: Subject to any disclaimer, the term of this patent is extended or adjusted under 35 U.S.C. 154(b) by 200 days.

This patent is subject to a terminal disclaimer.

(21) Appl. No.: 14/528,496

(22) Filed: Oct. 30, 2014

(65) Prior Publication Data

US 2015/0114114 A1 Apr. 30, 2015

(30) Foreign Application Priority Data

Oct. 31, 2013 (JP) ................. 2013-226532

(51) Int. Cl.
| | |
|---|---|
| *G01C 19/00* | (2013.01) |
| *G01C 19/5614* | (2012.01) |
| *G01C 19/5607* | (2012.01) |
| *G01P 3/02* | (2006.01) |

(52) U.S. Cl.
CPC ..... *G01C 19/5614* (2013.01); *G01C 19/5607* (2013.01); *G01P 3/02* (2013.01)

(58) Field of Classification Search
CPC .............................. G01P 3/02; G01C 19/5607
See application file for complete search history.

(56) References Cited

U.S. PATENT DOCUMENTS

| | | | |
|---|---|---|---|
| 6,389,897 B1 | 5/2002 | Tani et al. | |
| 6,845,666 B2 | 1/2005 | Mochida | |
| 6,927,568 B2 | 8/2005 | Nozoe et al. | |
| 7,418,863 B2 | 9/2008 | Higuchi | |
| 9,348,025 B2* | 5/2016 | Urban | ..................... G01S 15/87 |

(Continued)

FOREIGN PATENT DOCUMENTS

| | | |
|---|---|---|
| JP | 2000-304549 A | 11/2000 |
| JP | 2002-071353 A | 3/2002 |

(Continued)

OTHER PUBLICATIONS

U.S. Appl. No. 14/528,476, filed Oct. 30, 2014, Ryuta Nishizawa et al.

*Primary Examiner* — Harshad R Patel
*Assistant Examiner* — Samir M Shah
(74) *Attorney, Agent, or Firm* — Harness, Dickey & Pierce, P.L.C.

(57) ABSTRACT

An angular velocity sensor includes fixing units, a base portion, beam portions that support the base portion with respect to the fixing units, driving vibrating arms connected to the base portion, and detection vibrating arms connected to the base portion. When a width of a detection frequency band is set to f1 [Hz], a resonance frequency in a rotational vibration mode in which the base portion rotates and vibrates around a detection axis with respect to the fixing units in association with the deformation of the beam portions is set to f2 [Hz], and a detuning frequency is set to f3 [Hz], the relation of f1<f2<f3 is satisfied.

18 Claims, 16 Drawing Sheets

(56) References Cited

U.S. PATENT DOCUMENTS

| | | | | |
|---|---|---|---|---|
| 2005/0056095 | A1* | 3/2005 | Tomikawa | H03H 9/2473 73/504.16 |
| 2008/0111525 | A1* | 5/2008 | Fukuzawa | H04B 1/1607 323/273 |
| 2008/0111585 | A1* | 5/2008 | Fukuzawa | G01C 19/5607 327/41 |
| 2008/0111625 | A1* | 5/2008 | Fukuzawa | G01C 19/5607 330/254 |
| 2008/0111627 | A1* | 5/2008 | Fukuzawa | G01C 19/5607 330/261 |
| 2008/0257042 | A1* | 10/2008 | Tateyama | G01C 19/5607 73/504.12 |
| 2008/0257044 | A1* | 10/2008 | Watanabe | G01C 19/5656 73/504.15 |
| 2008/0314145 | A1* | 12/2008 | Sato | G01C 19/5607 73/504.16 |
| 2010/0098394 | A1* | 4/2010 | Ishihara | G02B 27/646 396/55 |
| 2011/0226057 | A1* | 9/2011 | Nishizawa | G01C 19/5642 73/504.12 |
| 2011/0232382 | A1* | 9/2011 | Amemiya | G01C 19/5607 73/504.12 |
| 2012/0055230 | A1* | 3/2012 | Naruse | G01C 19/5726 73/1.37 |
| 2013/0019681 | A1* | 1/2013 | Shimura | G01C 19/5607 73/504.16 |
| 2013/0033838 | A1* | 2/2013 | Sato | G01C 19/5663 361/777 |
| 2015/0078130 | A1* | 3/2015 | Urban | G01S 15/87 367/93 |
| 2015/0114113 | A1* | 4/2015 | Nishizawa | G01C 19/5607 73/504.12 |

FOREIGN PATENT DOCUMENTS

| | | |
|---|---|---|
| JP | 2004-279373 A | 10/2004 |
| JP | 2005-003538 A | 1/2005 |
| JP | 2005-121517 A | 5/2005 |
| JP | 3666335 B2 | 6/2005 |
| JP | 2007-107953 A | 4/2007 |
| JP | 2007-333420 A | 12/2007 |
| JP | 2008-058258 A | 3/2008 |
| JP | 2008-076263 A | 4/2008 |
| JP | 2009-150677 A | 7/2009 |
| JP | 2009-162778 A | 7/2009 |
| JP | 4337943 B2 | 9/2009 |
| JP | 2010-256332 A | 11/2010 |

* cited by examiner

MODE 1

MODE 1

ANGULAR VELOCITY SENSOR, ELECTRONIC APPARATUS, AND MOVING OBJECT

BACKGROUND

1. Technical Field

The present invention relates to an angular velocity sensor, an electronic apparatus, and a moving object.

2. Related Art

Angular velocity sensors detecting an angular velocity are used for, for example, body control in vehicles, host vehicle position detection of car navigation systems, and vibration control correction (so-called camera shake correction) of digital cameras, video cameras, and the like. For example, a vibration gyro sensor is known as such an angular velocity sensor (for example, see JP-A-2001-194157).

For example, an angular velocity sensor disclosed in JP-A-2001-194157 includes a vibrating body which is supported with respect to a frame body through a vibrating body supporting beam. In the angular velocity sensor, when an angular velocity around a z-axis is applied from the outside in a state where the vibrating body is vibrated (driving vibration) in an x-axis direction, a Coriolis force acts on the vibrating body, and thus the vibrating body is displaced (detection vibration) in a y-axis direction. Then, the angular velocity around the z-axis is detected by detecting the amount of displacement of the vibrating body in the y-axis direction.

Incidentally, in addition to an angular velocity to be detected, an impact from the outside may be applied to such an angular velocity sensor, and thus there is a concern that vibration occurring due to the impact may degrade detection accuracy and the like.

Consequently, in the angular velocity sensor disclosed in JP-A-2001-194157, the frame body is supported with respect to a supporting unit through a frame body supporting beam, and the frame body and the frame body supporting beam constitute an impact attenuation mechanism that attenuates the transmission of an impact along at least one of a vibration direction and a detection direction of the vibrating body to the vibrating body from the supporting unit. Thus, even when a waveform of an impact applied to the angular velocity sensor includes vibration close to a resonance frequency of the vibrating body in the vibration direction and the detection direction of the vibrating body, it is possible to suppress the influence on detection accuracy.

However, when rotational vibration around a y-axis is applied, the angular velocity sensor disclosed in JP-A-2001-194157 cannot attenuate the rotational vibration. For this reason, when rotational vibration including a frequency component near a detuning frequency (difference between a resonance frequency in a driving vibration mode and a resonance frequency in a detection vibration mode) is applied, for example, due to the resonance of a substrate on which a sensor is mounted, an unexpected signal is generated due to the resonance of the detection vibration, and the signal is saturated within an IC for processing the signal. As a result, there is a problem in that an output fluctuates.

SUMMARY

An advantage of some aspects of the invention is to provide an angular velocity sensor capable of suppressing the fluctuation of an output due to rotational vibration even when the rotational vibration around a detection axis is received and to provide an electronic apparatus and a moving object, having excellent reliability, which include the angular velocity sensor.

The invention can be implemented as the following forms or application examples.

Application Example 1

This application example is directed to an angular velocity sensor including a fixing unit; a base portion; a supporting unit that supports the base portion with respect to the fixing unit; a vibration unit that is connected to the base portion; and a detection unit that is connected to the base portion and vibrates by an action of a Coriolis force based on an angular velocity around a detection axis. When a width of a detection frequency band is set to f1 [Hz], a resonance frequency in a rotational vibration mode in which the base portion rotates and vibrates around the detection axis with respect to the fixing unit in association with deformation of the supporting unit is set to f2 [Hz], and a detuning frequency is set to f3 [Hz], a relation of $f1<f2<f3$ is satisfied.

According to the angular velocity sensor, the resonance frequency f2 in the rotational vibration mode is made smaller than the detuning frequency f3. Thus, when the rotational vibration around the detection axis is received from the outside, it is possible to attenuate the rotational vibration in a frequency band near the detuning frequency f3. Accordingly, it is possible to use the rotational vibration mode of the resonance frequency f2 as a mechanical low-pass filter (rotational vibration attenuation mode) which suppresses the rotational vibration of the base portion around the detection axis which is associated with the deformation of the supporting unit, in a frequency band which is higher than f2.

In addition, the resonance frequency f2 in the rotational vibration mode is set to be greater than the width f1 of the detection frequency band, and thus the amplification of the rotational vibration can be made small in the detection frequency band when the rotational vibration around the detection axis is received from the outside.

As described above, when rotational vibration around the detection axis is received from the outside, it is possible to suppress the fluctuation of an output even when a frequency of the rotational vibration is near the detuning frequency f3.

Application Example 2

In the angular velocity sensor according to the application example described above, it is preferable that the rotational vibration mode is a primary rotational vibration mode.

With this configuration, resonance frequencies in other rotational vibration modes around the detection axis of the base portion are not present on the frequency side lower than f2. Thus, it is possible to make a difference between f1 and f2 relatively small. Accordingly, it is also possible to make the detuning frequency f3 small. As a result, it is possible to realize an excellent S/N ratio.

Application Example 3

In the angular velocity sensor according to the application example described above, it is preferable that a relation of $1.4 \le f3/f2$ is satisfied.

With this configuration, it is possible to enhance an effect of suppressing the rotational vibration around the detection axis from the outside.

Application Example 4

In the angular velocity sensor according to the application example described above, it is preferable that a relation of $f3/f2 \leq 4$ is satisfied.

With this configuration, it is possible to prevent the detuning frequency from becoming excessively large. As a result, it is possible to realize an excellent S/N ratio.

Application Example 5

In the angular velocity sensor according to the application example described above, it is preferable that a Q value in the primary rotational vibration mode is equal to or greater than 5 and equal to or less than 100.

With this configuration, it is possible to enhance an effect of the rotational vibration attenuation mode while preventing adverse effects from being exerted on the detection vibration or preventing damage from being caused due to an excessive increase in the resonant vibration in the primary rotational vibration mode.

Application Example 6

In the angular velocity sensor according to the application example described above, it is preferable that a relation of $f1/f2 \leq 0.5$ is satisfied.

With this configuration, when the rotational vibration around the detection axis is received from the outside, the amplification of the rotational vibration can be made extremely small in the detection frequency band.

Application Example 7

This application example is directed to an electronic apparatus including the angular velocity sensor according to the application example described above.

With this configuration, it is possible to provide the electronic apparatus having excellent reliability.

Application Example 8

This application example is directed to a moving object including the angular velocity sensor according to the application example described above.

With this configuration, it is possible to provide the moving object having excellent reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an angular velocity sensor, an electronic apparatus, and a moving object according to the invention will be described in detail with reference to embodiments shown in the accompanying drawings.

1. Angular Velocity Sensor

First Embodiment

Figure 1:
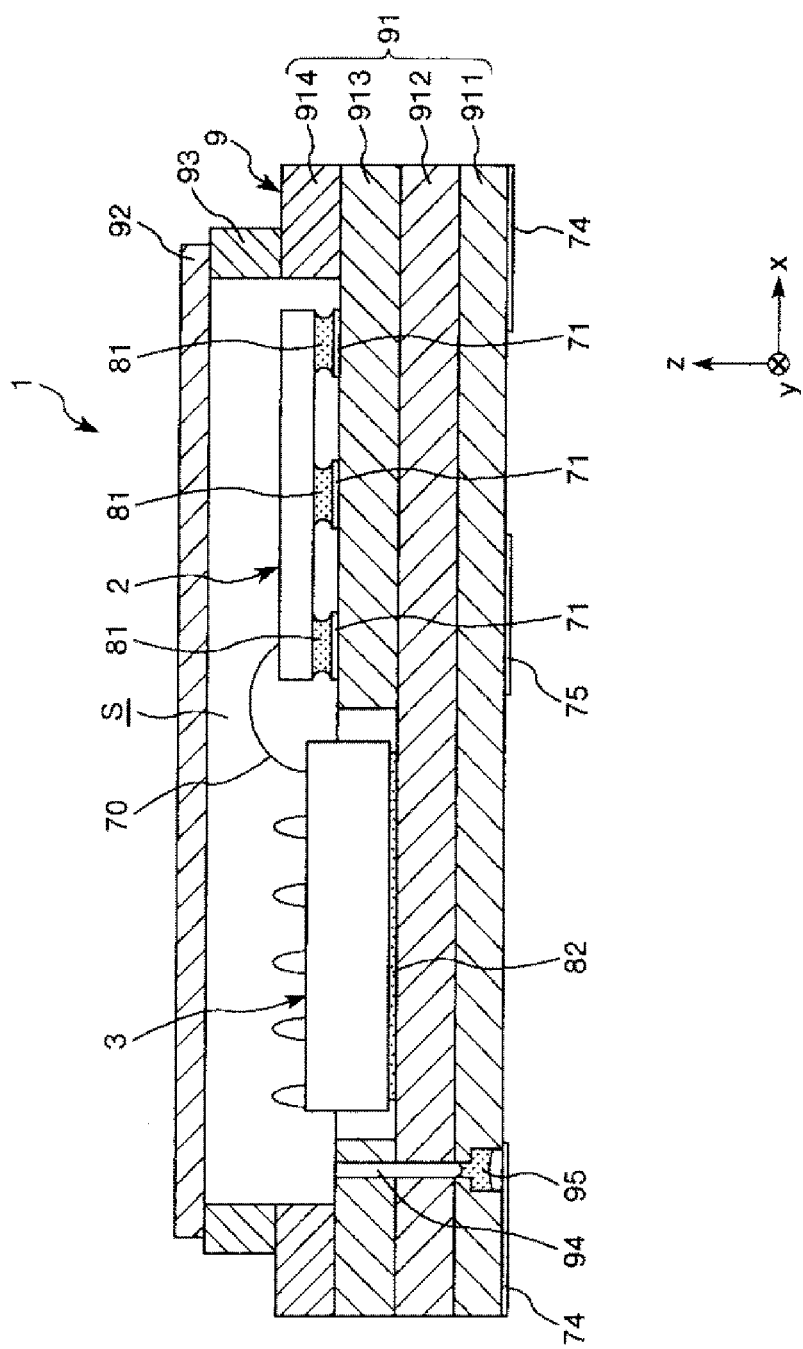
FIG. 1 is a cross-sectional view showing a schematic configuration of an angular velocity sensor according to a first embodiment of the invention.
Figure 2:
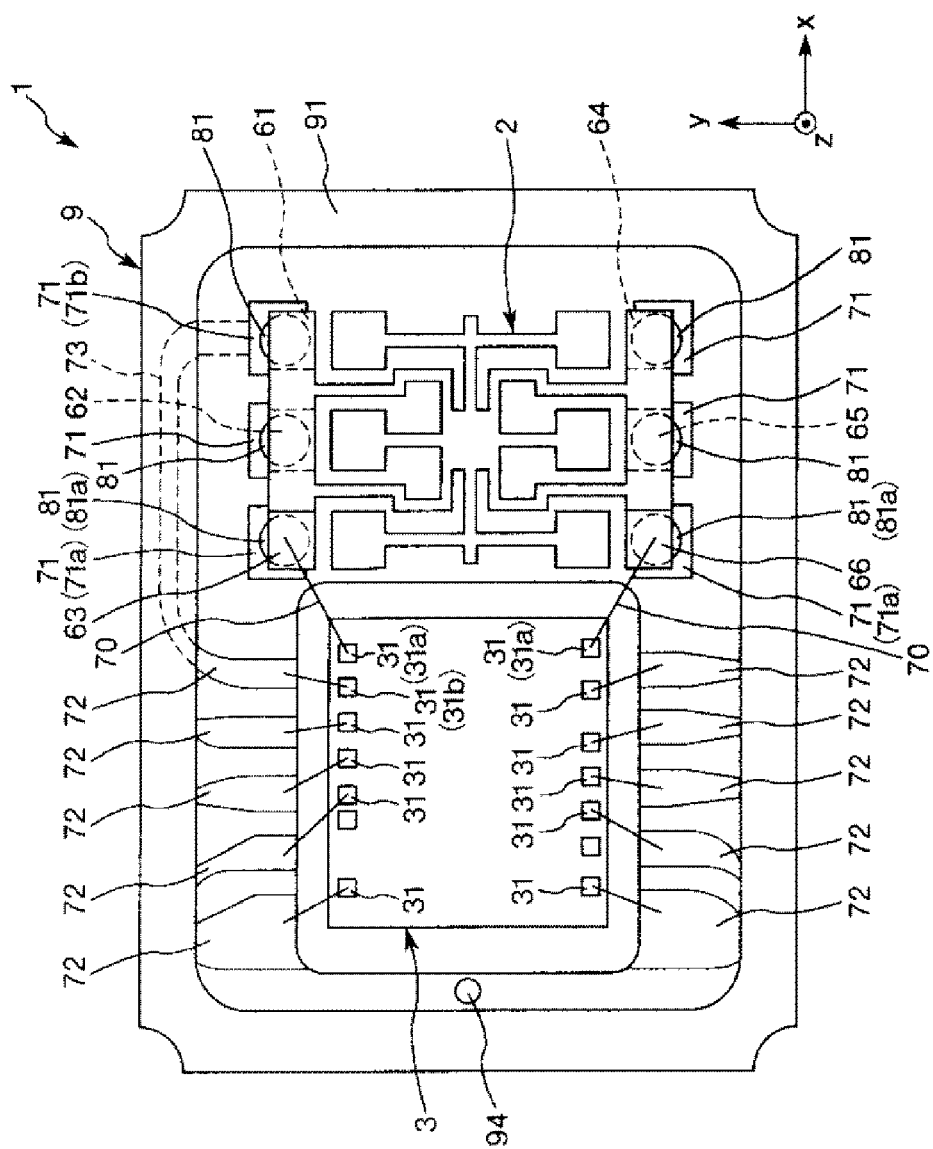
FIG. 2 is a plan view of the angular velocity sensor shown in FIG. 1.
Figure 3:
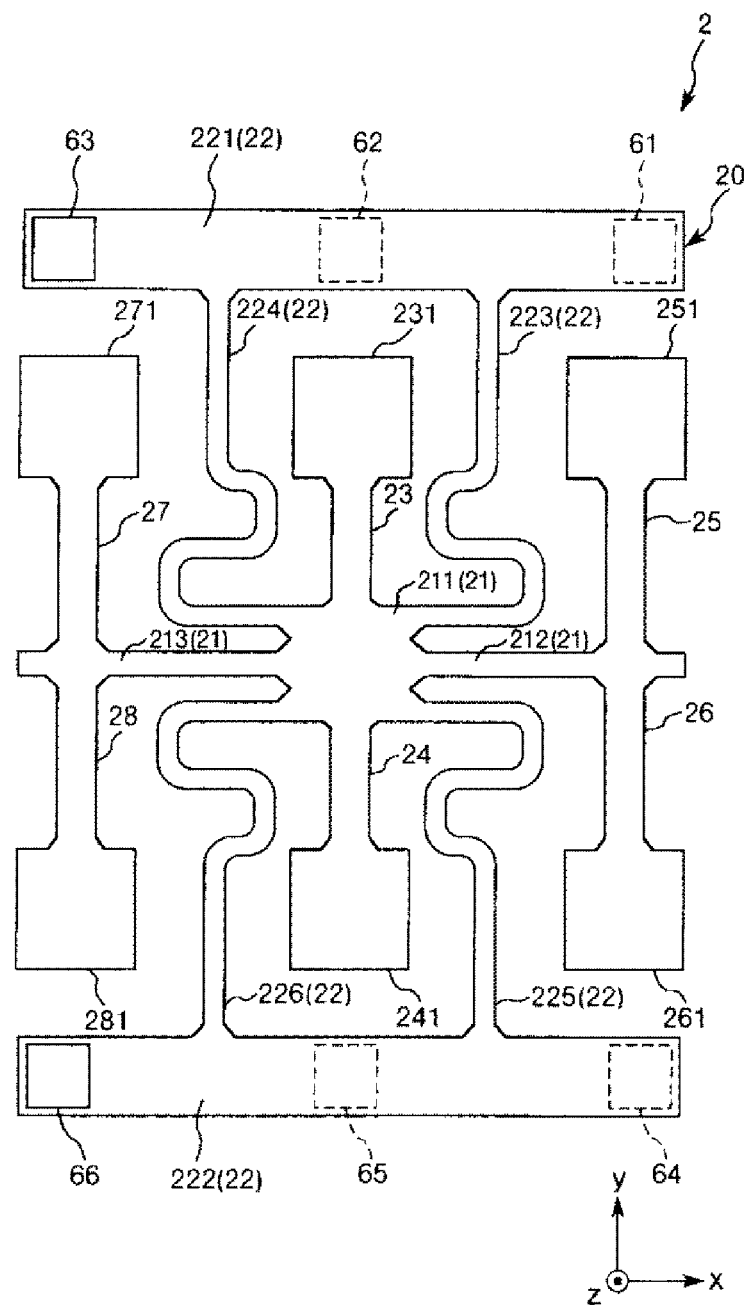
FIG. 3 is a plan view of a sensor element included in the angular velocity sensor shown in FIG. 1.
Figure 4A:
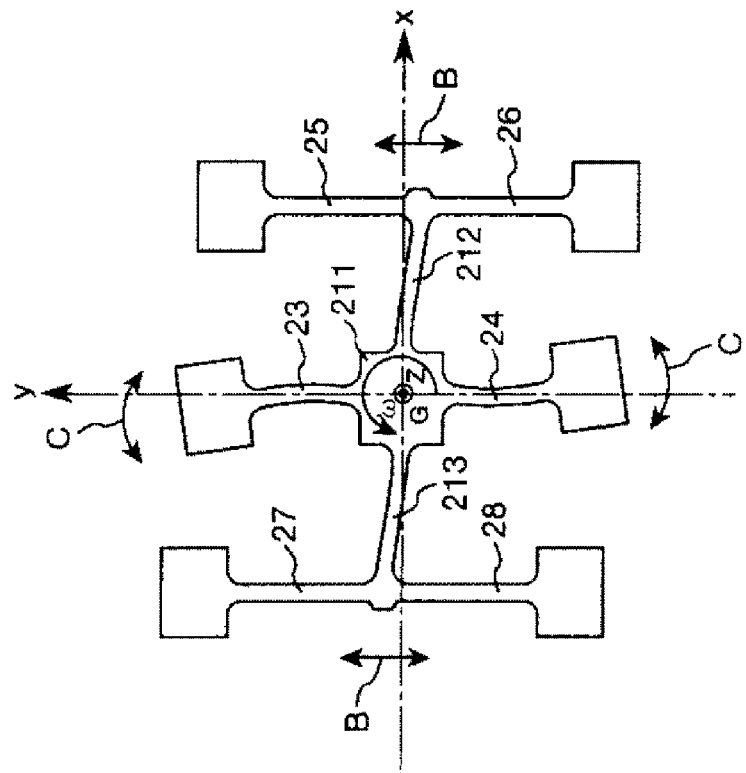
FIGS. 4A and 4B are plan views illustrating the operation of the sensor element shown in FIG. 3.
Figure 4B:
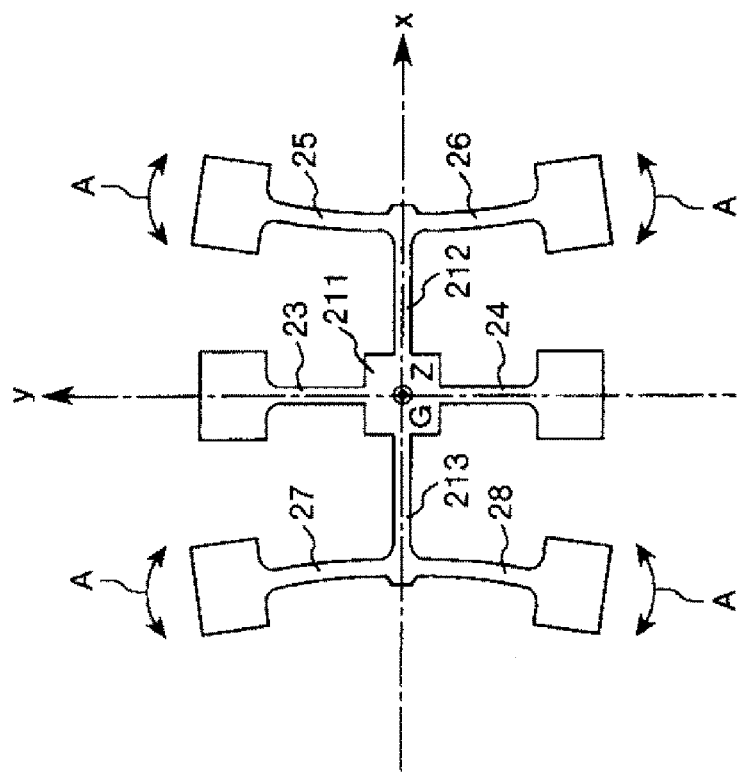

FIG. 1 is a cross-sectional view showing a schematic configuration of an angular velocity sensor according to a first embodiment of the invention. FIG. 2 is a plan view of the angular velocity sensor shown in FIG. 1. FIG. 3 is a plan view of a sensor element included in the angular velocity sensor shown in FIG. 1. FIGS. 4A and 4B are plan views illustrating the operation of the sensor element shown in FIG. 3.

Meanwhile, in FIGS. 1 to 4, an x-axis, a y-axis, and a z-axis are shown as three mutually perpendicular axes for convenience of description, and a tip end side of an arrow shown in the drawing is assumed to be "+(positive)" and a base end side is assumed to be "−(negative)". In addition, hereinafter, a direction parallel to the x-axis is referred to as an "x-axis direction", a direction parallel to a y-axis is referred to as a "y-axis direction", a direction parallel to a z-axis is referred to as a "z-axis direction", a +z side (upper side in FIG. 1) is referred to as "up", and a −z side (lower side in FIG. 1) is referred to as "down".

An angular velocity sensor 1 shown in FIGS. 1 and 2 is a vibration gyro sensor that detects an angular velocity around the z-axis. The angular velocity sensor 1 includes a sensor element (vibrator element) 2, an IC chip 3, and a package 9 accommodating the sensor element 2 and the IC chip 3.

Hereinafter, units constituting the angular velocity sensor 1 will be sequentially described.

Sensor Element

The sensor element 2 is an "out-of-plane detection type" sensor element that detects an angular velocity around the z-axis. As shown in FIG. 3, the sensor element 2 includes a vibrator element 20, and a plurality of detection electrodes (not shown), a plurality of driving electrodes (not shown), and a plurality of terminals 61 to 66 which are provided on the surface of the vibrator element 20.

As shown in FIG. 3, the vibrator element 20 has a structure which is called a double T-type.

Specifically, the vibrator element 20 includes a base portion 21, a supporting unit 22 supporting the base portion 21, and two detection vibrating arms 23 and 24, and four driving vibrating arms 25 to 28 which extend from the base portion 21.

The base portion 21 includes a body 211, and a pair of connecting arms 212 and 213 extending to the opposite sides from the body 211 along the x-axis direction.

The supporting unit 22 includes a pair of fixing units 221 and 222 fixed to the package 9, a pair of beam portions 223 and 224 connecting the fixing unit 221 and the body 211 of the base portion 21, and a pair of beam portions 225 and 226 connecting the fixing unit 222 and the body 211 of the base portion 21. Here, it can be said that the beam portions 223, 224, 225, and 226 constitute a "supporting unit" supporting the base portion 21 with respect to the fixing units 221 and 222. Meanwhile, it can be said that the fixing units 221 and 222 and the beam portions 223, 224, 225, and 226 constitute a "supporting unit" and the package 9 or a base 91 to be described later of the package 9 constitute a "fixing unit". In addition, it can be said that the body 211 mentioned above of the base portion 21 constitutes a "base portion".

The detection vibrating arms 23 and 24 extend to the opposite sides along the y-axis direction from the body 211 of the base portion 21. Here, the detection vibrating arms 23 and 24 are connected to the base portion 21 and thus constitute a "detection unit" that vibrates by an action of a Coriolis force based on an angular velocity around a detection axis.

The driving vibrating arms 25 and 26 extend to the opposite sides along the y-axis direction from the tip portion of the connecting arm 212 of the base portion 21. Similarly, the driving vibrating arms 27 and 28 extend to the opposite sides along the y-axis direction from the tip portion of the connecting arm 213 of the base portion 21. Here, the driving vibrating arms 25, 26, 27, and 28 constitute a "vibration unit" connected to the base portion 21.

In this embodiment, the tip portion of the detection vibrating arm 23 is provided with a weight portion (hammer head) 231 having a width larger than that of the base end portion thereof. Similarly, the tip portion of the detection vibrating arm 24 is provided with a weight portion 241, the tip portion of the driving vibrating arm 25 is provided with a weight portion 251, the tip portion of the driving vibrating arm 26 is provided with a weight portion 261, the tip portion of the driving vibrating arm 27 is provided with a weight portion 271, and the tip portion of the driving vibrating arm 28 is provided with a weight portion 281. It is possible to achieve the miniaturization and an improvement in the detection sensitivity of the sensor element 2.

In this embodiment, the vibrator element 20 is formed of a piezoelectric material.

Examples of such a piezoelectric material include quartz crystal, lithium tantalate, lithium niobate, lithium borate, barium titanate, and the like. In particular, quartz crystal (Z cut plate) is preferably used as the piezoelectric material for forming the vibrator element 20. When the vibrator element 20 is formed of quartz crystal, it is possible to form the vibrator element 20 having an excellent vibration characteristic (particularly, a frequency temperature characteristic). In addition, it is possible to form the vibrator element 20 with a high dimensional accuracy through etching.

Although not shown in the drawing, each of the driving vibrating arms 25, 26, 27, and 28 of the vibrator element 20 configured in this manner is provided with a pair of driving electrodes (a driving signal electrode and a driving ground electrode) which bend and vibrate the driving vibrating arms 25, 26, 27, and 28 in the x-axis direction by electrification. The pair of driving electrodes provided in each of the driving vibrating arms 25 to 28 are electrically connected to the terminal 61 (driving signal terminal) and the terminal 64 (driving ground terminal) which are provided in the fixing unit 221 shown in FIG. 3 through wirings not shown in the drawing.

Although not shown in the drawing, each of the detection vibrating arms 23 and 24 of the vibrator element 20 is provided with a pair of detection electrodes (a detection signal electrode and a detection ground electrode) which detect charge generated in association with the bending vibration of the detection vibrating arms 23 and 24 in the x-axis direction. The pair of detection electrodes provided in the detection vibrating arm 23 are electrically connected to the terminal 62 (detection ground terminal) and the terminal 63 (detection signal terminal) which are provided in the fixing unit 221 shown in FIG. 3 through wirings not shown in the drawing. Similarly, the pair of detection electrodes provided in the detection vibrating arm 24 are electrically connected to the terminal 65 (detection ground terminal) and the terminal 66 (detection signal terminal) through wirings not shown in the drawing.

Although constituent materials of the driving electrodes, the detection electrodes, and the terminals 61 to 66 are not particularly limited, a metal material such as, for example, gold (Au), gold alloy, platinum (Pt), aluminum (Al), aluminum alloy, silver (Ag), silver alloy, chromium (Cr), chrome alloys, copper (Cu), molybdenum (Mo), niobium (Nb), tungsten (W), iron (Fe), titanium (Ti), cobalt (Co), zinc (Zn), or zirconium (Zr), and a transparent electrode material such as ITO or ZnO can be used as the constituent materials. Among these, a metal containing gold as a main material (gold or a gold alloy) or platinum is preferably used.

Meanwhile, a layer such as Ti or Cr may be provided as a ground layer having a function of preventing the driving electrode and the like from being peeled off from the vibrator element 20, between the driving electrodes and the vibrator element 20. In addition, the driving electrodes and the like can be collectively formed through the same film formation process.

The sensor element 2 configured in this manner detects an angular velocity ω around the z-axis in the following manner.

First, as shown in FIG. 4A, the driving vibrating arm 25 and the driving vibrating arm 27 are bent and vibrated (driving vibration) so as to approach and separate from each other in a direction shown by an arrow A in the drawing and the driving vibrating arm 26 and the driving vibrating arm 28 are bent and vibrated (driving vibration) so as to approach and separate from each other in the same direction as that of the above-described bending vibration, by applying a voltage (driving signal) between the terminal 61 and the terminal 64.

At this time, when an angular velocity is not applied to the sensor element 2, the driving vibrating arms 25 and 26 and the driving vibrating arms 27 and 28 perform plane-symmetrical vibration with respect to a yz plane passing through a center point (centroid G), and thus the base portion 21 (the body 211 and the connecting arms 212 and 213) and the detection vibrating arms 23 and 24 hardly vibrate.

In this manner, when an angular velocity ω around a normal line (that is, around the z-axis) which passes through the centroid G is applied to the sensor element 2 in a state where the driving vibrating arms 25 to 28 are driven and vibrated (driving mode), a Coriolis force acts on each of the driving vibrating arms 25 to 28. Thus, as shown in FIG. 4B, the connecting arms 212 and 213 are bent and vibrated in a direction shown by an arrow B in the drawing. Accordingly, the bending vibration (detection vibration) of the detection vibrating arms 23 and 24 in a direction shown by an arrow C in the drawing is excited so as to cancel the bending vibration of the connecting arms.

Then, charge generated between the pair of detection electrodes due to the detection vibration (detection mode) of the detection vibrating arm 23 is output from the terminals 62 and 63. In addition, charge generated between the pair of detection electrodes due to the bending vibration of the detection vibrating arm 24 is output from the terminals 65 and 66.

In this manner, it is possible to obtain the angular velocity ω applied to the sensor element 2 on the basis of the charge output from the terminals 62, 63, 65, and 66.

IC Chip 3

The IC chip 3 shown in FIGS. 1 and 2 is an electronic component having a function of driving the sensor element 2 mentioned above and a function of detecting an output (sensor output) from the sensor element 2.

Although not shown in the drawing, such an IC chip 3 includes a driving circuit that drives the sensor element 2 and a detection circuit that detects an output (charge) from the sensor element 2.

In addition, the IC chip 3 is provided with a plurality of connection terminals 31.

The plurality of connection terminals 31 include one connection terminal 31b that outputs a driving signal for driving the sensor element 2 mentioned above, and two connection terminals 31a to which a detection signal from the sensor element 2 is applied.

One of the two connection terminals 31a is electrically connected to the terminal 63 of the sensor element 2 through a wiring 70, and the other one thereof is electrically connected to the terminal 66 of the sensor element 2 through the wiring 70.

The wiring 70 is constituted by a bonding wire of which one end is fixed to the terminal 63 or the terminal 66 and the other end is fixed to the connection terminal 31a. Meanwhile, the wiring 70 may be connected to an internal terminal 71a provided in the base 91 of the package 9 to be described later.

On the other hand, the connection terminal 31b is electrically connected to the terminal 61 of the sensor element 2 through a wiring 73 provided in the base 91 of the package 9 to be described later.

Package

The package 9 accommodates the sensor element 2 and the IC chip 3.

The package 9 includes the base 91 having a concave portion opened to the upper surface thereof, and a lid 92 which is bonded to the base 91 through a bonding member 93 (seal ring) so as to close an opening of the concave portion of the base 91. Such a package 9 has an accommodation space S on the inner side thereof, and the sensor element 2 and the IC chip 3 are airtightly accommodated and installed within the accommodation space S.

The sensor element 2 and the IC chip 3 mentioned above are installed in the base 91.

In this embodiment, as shown in FIG. 2, the sensor element 2 and the IC chip 3 are disposed to be lined up with each other in the x-axis direction when the base 91 is seen in a plan view.

The base 91 is constituted by a flat plate-shaped substrate 911, a flat plate-shaped substrate 912 bonded to the top face of the substrate 911, a frame-shaped substrate 913 bonded to the top face of the substrate 912, and a frame-shaped substrate 914 bonded to the top face of the substrate 913.

Such a base 91 is provided with a concave portion having a level difference formed between the top face of the substrate 912 and the top face of the substrate 913 and a level difference formed between the top face of the substrate 913 and the top face of the substrate 914.

A constituent material of the base 91 (constituent materials of the substrates 911 to 914) is not particularly limited, but various types of ceramics such as, for example, aluminum oxide can be used as the constituent material.

A plurality of internal terminals 71 and a plurality of internal terminals 72 are provided on the top face of the substrate 913 of the base 91.

The plurality of internal terminals 71 include two internal terminals 71a for a dummy and one internal terminal 71b for a driving signal.

The internal terminal 71b is electrically connected to one internal terminal 72 through the wiring 73 provided in the base 91.

The wiring 73 electrically connects the terminal 61 of the sensor element 2 and the connection terminal 31b of the IC chip 3.

In addition, three internal terminals 71 other than two internal terminals 71a and one internal terminal 71b are electrically connected to the corresponding three internal terminals 72 through wirings (not shown) provided in the base 91.

On the other hand, the two internal terminals 71a are dummy terminals which are not electrically connected to the internal terminal 72, and are used to increase stability at the time of fixing the sensor element 2 to the base 91.

The sensor element 2 is fixed to the plurality of (six) internal terminals 71 through the respective fixing members 81.

Here, the fixing members 81 corresponding to four internal terminals 71, except for two internal terminals 71a among the plurality of internal terminals 71, are constituted by, for example, solder, silver paste, or a conductive adhesive (adhesive in which a conductive filler such as metal particles is dispersed in a resin material). Thus, the four internal terminals 71 are electrically connected to the terminals 61, 62, 64, and 65 of the sensor element 2 through the fixing members 81.

In addition, two fixing members 81 (fixing members 81a) corresponding to two internal terminals 71a may be constituted by, for example, solder, silver paste, or a conductive adhesive (adhesive in which a conductive filler such as metal particles is dispersed in a resin material), or may be constituted by a non-conductive adhesive including an epoxy resin, an acrylic resin, or the like.

The plurality of connection terminals 31 (except for two connection terminals 31a) of the IC chip 3 mentioned above are electrically connected to the plurality of internal terminals 72, for example, through wirings constituted by a bonding wire.

Meanwhile, as described above, each connection terminal 31a is electrically connected to the terminal 63 or the terminal 66 of the sensor element 2 through the wiring 70 constituted by a bonding wire.

In addition, the IC chip 3 mentioned above is fixed to the top face of the substrate 912 of the base 91 using a fixing member 82 such as, for example, an adhesive configured to include an epoxy resin, an acrylic resin, or the like. Thus, the IC chip 3 is supported and fixed to the base 91.

In addition, a bottom face (opposite side to the sensor element 2) of the substrate 911 of the base 91 is provided with a plurality of external terminals 74 used when the angular velocity sensor 1 is mounted on a device (external device) in which the angular velocity sensor is to be embedded, and an external terminal 75 (adjustment terminal) for adjusting the IC chip 3.

The plurality of external terminals 74 and 75 are electrically connected to the corresponding internal terminals 72 through internal wirings, not shown in the drawing, respectively. Thus, the external terminals 74 and 75 are electrically connected to the IC chip 3.

Each of the internal terminals 71 and 72, external terminals 74 and 75, and the like is constituted by a metal coating in which a coating such as nickel (Ni) or gold (Au) is laminated on a metallized layer such as, for example, tungsten (W) through plating or the like.

The lid 92 is airtightly bonded to the base 91 through the bonding member 93. Thus, the inside of the package 9 is airtightly sealed.

For example, the lid 92 is constituted by the same material as that of the base 91 or a metal such as Kovar, 42 alloy, or stainless steel.

In addition, the bonding member 93 is constituted by a metal such as, for example, Kovar, 42 alloy, or stainless steel.

A method of bonding the base 91 and the lid 92 is not particularly limited, but a welding method such as, for example, seam welding or laser welding can be used.

In addition, the base 91 is provided with a through hole 94 to be used when decompressing the inside of the accommodation space S or injecting an inert gas into the accommodation space. The through hole 94 is sealed using a sealing material 95.

For example, when the inside of the accommodation space S is decompressed, first, air inside the accommodation space S is removed through the through hole 94 before being sealed by the sealing material 95. While maintaining this state, a metal ball serving as the sealing material 95 is placed within the through hole 94, and the metal ball is melted using a laser to thereby form the sealing material 95, thereby sealing the through hole 94.

A schematic configuration of the angular velocity sensor 1 has been described so far. In such an angular velocity sensor 1, the base portion 21 is supported by the fixing units 221 and 222 through the beam portions 223, 224, 225, and 226, and thus the base portion 21 may rotate around the z-axis (detection axis) with respect to the fixing units 221 and 222 (hereinafter, simply referred to as "rotational vibration of the base portion 21") in association with elastic deformation due to the bending of the beam portions 223, 224, 225, and 226.

When the angular velocity sensor 1 receives the rotational vibration around the detection axis from the outside (hereinafter, simply referred to as "rotational vibration from the outside") due to, for example, the resonance of a substrate on which the sensor is mounted, the detection vibration is excited due to the generation of a Coriolis force, as described above. In addition, when the rotational vibration from the outside includes a frequency component near a detuning frequency which is a difference between a resonance frequency in a driving vibration mode and a resonance frequency in a detection vibration mode, an output may be amplified due to the resonance in the detection vibration mode.

Consequently, in the angular velocity sensor 1, when a width of a detection frequency band is set to f1 [Hz], a resonance frequency in a rotational vibration mode in which the base portion 21 rotates and vibrates (reciprocally rotates) around the detection axis with respect to the fixing units 221 and 222 in association with the deformation of the beam portions 223, 224, 225, and 226 is set to f2 [Hz], and a detuning frequency is set to f3 [Hz], the relation of f1<f2<f3 is satisfied.

According to the angular velocity sensor 1 having such a frequency relationship, the rotational vibration mode of the resonance frequency f2 is used as a mechanical low-pass filter (hereinafter, referred to as a "rotational vibration attenuation mode") which suppresses the rotational vibration of the base portion 21 around the detection axis associated with the deformation of the beam portions 223 to 225, and thus it is possible to suppress the fluctuation of an output due to the rotational vibration even when the rotational vibration around the detection axis is received. Here, the "detection frequency band" is referred to as a sensor band, and is generally set by a low-pass filter constituted by an electrical circuit. Although not shown in the drawing, for example, the electrical low-pass filter is embedded in the IC chip 3 in this embodiment. In addition, the "width of detection frequency band" is equal to an upper limit frequency of the detection frequency band.

Figure 5A:
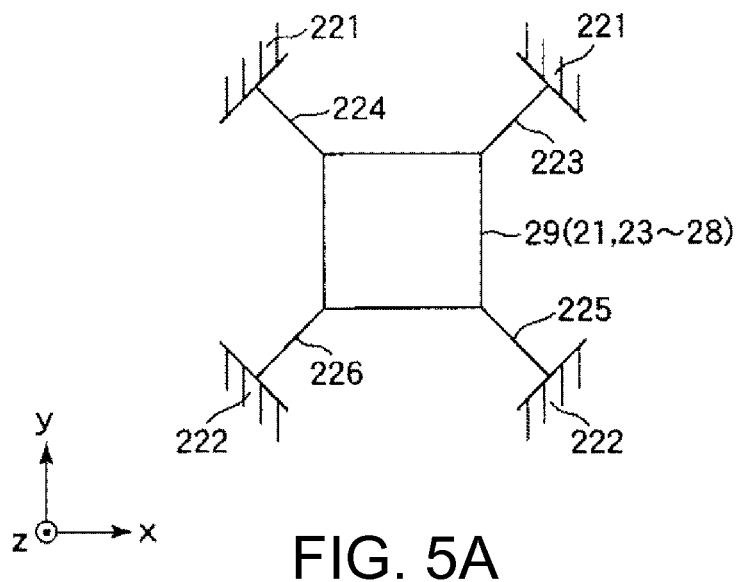
FIG. 5A is a diagram showing a simplified model of the angular velocity sensor shown in FIG. 3.
Figure 5B:
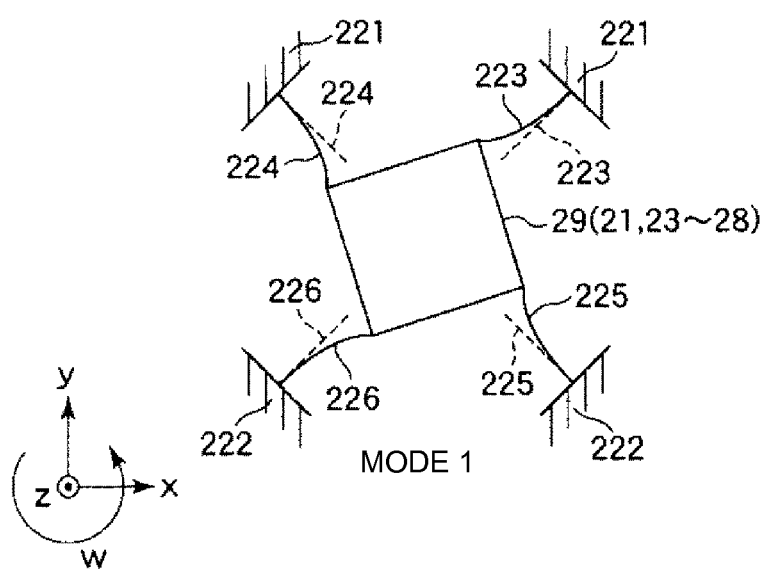
FIG. 5B is a diagram showing a primary rotational vibration mode (mode 1).

FIG. 5A is a diagram showing a simplified model of the angular velocity sensor shown in FIG. 3, and FIG. 5B is a diagram showing a primary rotational vibration mode (mode 1).

In the angular velocity sensor 1 configured in the above-described manner, a mass 29 constituted by the base portion 21, the detection vibrating arms 23 and 24, and the driving vibrating arms 25, 26, 27, and 28 can be regarded as a vibration system supported by the fixing units 221 and 222 through the beam portions 223, 224, 225, and 226 which are springs (elastic bodies), as shown in FIG. 5A.

Such a vibration system has a "primary rotational vibration mode" which is a basic mode in which the mass 29 rotates and vibrates around the detection axis in association with the primary bending of the beam portions 223, 224, 225, and 226 as shown in FIG. 5B, as a rotational vibration mode around the detection axis. A resonance frequency f2 in the primary rotational vibration mode can be appropriately set in accordance with the size of the mass 29 and spring constants of the beam portions 223 to 226. Hereinafter, a description will be made of an example of a case where the primary rotational vibration mode is used as a rotational vibration attenuation mode.

Figure 6:
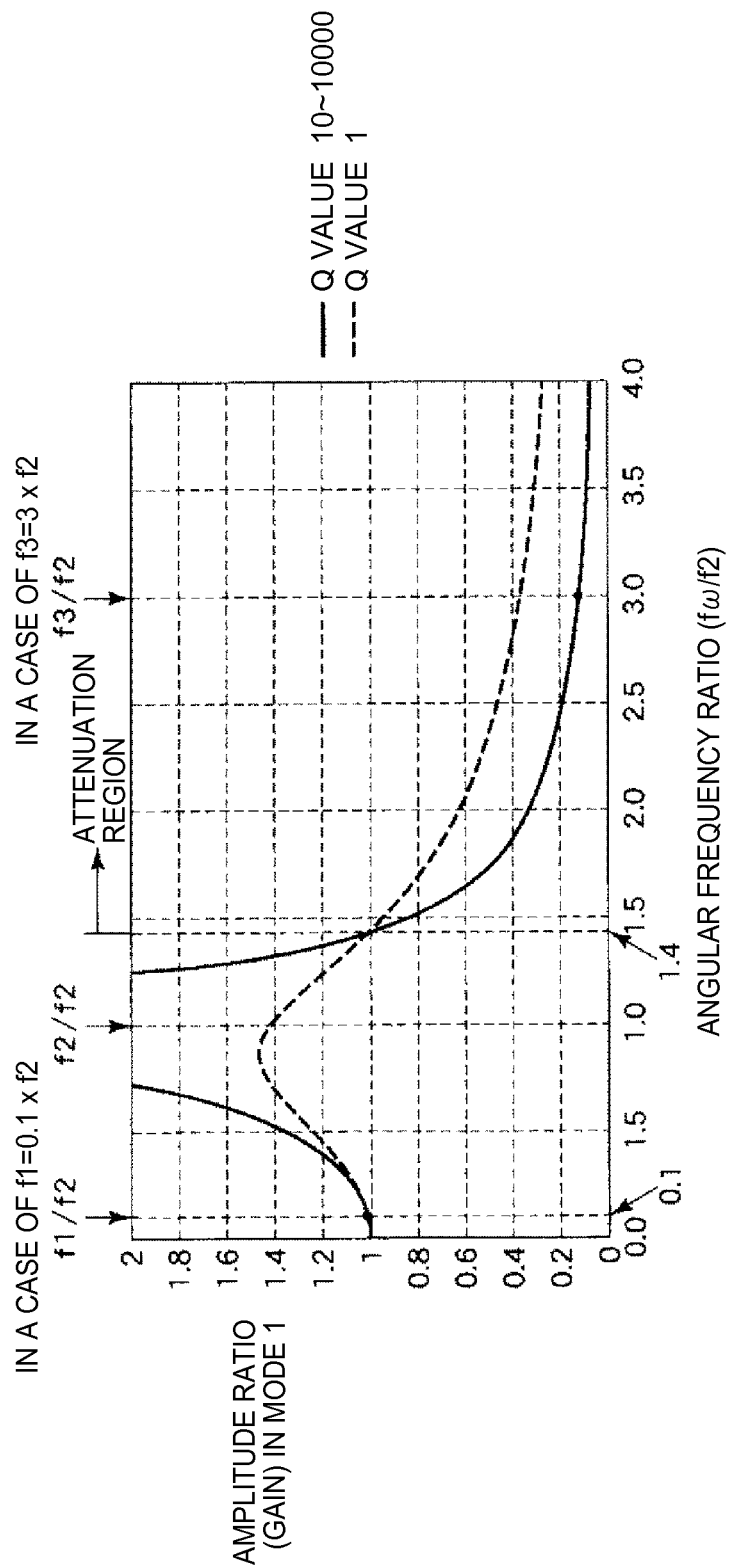
FIG. 6 is a graph showing a relationship between an angular frequency ratio and an amplitude ratio (gain) in a primary rotational vibration mode.

FIG. 6 is a graph showing a relationship between an angular frequency ratio and an amplitude ratio (gain) in a primary rotational vibration mode. Meanwhile, in FIG. 6, a horizontal axis "angular frequency ratio" is an axis obtained by standardizing a frequency fω of rotational vibration around the detection axis, which is applied to the angular velocity sensor 1 from the outside, by a resonance frequency f2 in the primary rotational vibration mode, that is, a ratio fω/f2 of fω to f2. In addition, a vertical axis "amplitude ratio in mode 1" is an axis obtained by performing standardization by an amplitude in the primary rotational vibration mode when fω/f2 is zero (that is, during a uniform circular motion in which a frequency of the rotational vibration around the detection axis, which is applied to the angular velocity sensor 1 from the outside, is zero).

As shown in FIG. 6, in a frequency band on the high frequency side with respect to the resonance frequency f2 in the primary rotational vibration mode (particularly, in a band in which fω/f2 is set to equal to or greater than 1.4), it is possible to attenuate the rotational vibration around the detection axis from the outside. Accordingly, the resonance frequency f2 in the primary rotational vibration mode is made smaller than the detuning frequency f3. Thus, when rotational vibration around the detection axis is received from the outside, it is possible to attenuate the rotational vibration in a frequency band near the detuning frequency f3.

On the other hand, in a frequency band on the low frequency side with respect to the resonance frequency f2 in the primary rotational vibration mode (particularly, a band in which fω/f2 is set to equal to or less than 0.5), the amplification of the rotational vibration around the detection axis from the outside can be made small. Accordingly, the resonance frequency f2 in the primary rotational vibration mode is set to be greater than the width f1 of the detection frequency band, and thus the amplification of the rotational vibration can be made small in the detection frequency band when the rotational vibration around the detection axis from the outside is received.

Here, the primary rotational vibration mode is used as a rotational vibration control mode. Accordingly, resonance frequencies in other rotational vibration modes around the detection axis of the base portion 21 are not present on the frequency side lower than f2. Thus, it is possible to make a difference between f1 and f2 relatively small. Accordingly, it is also possible to make the detuning frequency f3 small. As a result, it is possible to realize an excellent S/N ratio.

In addition, as shown in FIG. 6, when the relation of 1.4≤f3/f2 is satisfied, the rotational vibration from the outside can be attenuated. However, from the viewpoint of enhancing an effect of suppressing the rotational vibration around the detection axis from the outside, it is preferable that the relation of 1.8≤f3/f2 be satisfied, it is more preferable that the relation of 2.5≤f3/f2 be satisfied, and it is further preferable that the relation of 3.0≤f3/f2 be satisfied. It is possible to attenuate the rotational vibration from the outside to equal to or less than one-half by satisfying the relation of 1.8≤f3/f2. In addition, it is possible to attenuate the rotational vibration from the outside to equal to or less than one-fifth by satisfying the relation of 2.5≤f3/f2. Further, it is possible to attenuate the rotational vibration from the outside to approximately one-tenth or equal to or less than one-tenth by satisfying the relation of 3.0≤f3/f2.

In addition, from the viewpoint of preventing the detuning frequency f3 from becoming excessively large, it is preferable that the relation of f3/f2≤4 be satisfied, and it is more preferable that the relation of f3/f2≤3.5 be satisfied. Thus, it is possible to realize an excellent S/N ratio.

As shown in FIG. 6, as a Q value in the primary rotational vibration mode becomes high, an amplitude at the resonance frequency f2 becomes large and an effect in the rotational vibration control mode is enhanced. However, when the Q value in the primary rotational vibration mode is equal to or greater than 10, an amplitude at the resonance frequency f2 becomes large as the Q value in the primary rotational vibration mode becomes high, but an effect in the rotational vibration control mode does not change much. From this perspective, the Q value in the primary rotational vibration mode is preferably equal to or greater than 5 and equal to or less than 100, and is more preferably equal to or greater than 10 and equal to or less than 100. Thus, it is possible to enhance an effect in the rotational vibration attenuation mode while preventing adverse effects from being exerted on the detection vibration or preventing damage from being caused due to an excessive increase in the resonant vibration in the primary rotational vibration mode. Meanwhile, although not shown in FIG. 6, the amplitude ratio in a case of the Q value in the primary rotational vibration mode being 5 is substantially coincident with a curved line shown by a solid line in FIG. 6 in a range of the angular frequency ratio being equal to or higher than 2.0.

In addition, it is preferable that the relation of f1/f2≤0.5 be satisfied, it is more preferable that the relation of f1/f2≤0.3 be satisfied, and it is further preferable that the relation of f1/f2≤0.2 be satisfied. Thus, when the rotational vibration around the detection axis is received from the outside, it is possible to make the amplification of the rotational vibration extremely small in the detection frequency band.

In addition, a specific width f1 (upper limit frequency) is set when necessary, and is not particularly limited. However, for example, the width is preferably equal to or higher than 10 Hz and equal to or lower than 300 Hz and more preferably equal to or higher than 10 Hz and equal to or lower than 200 Hz.

In addition, a specific detuning frequency f3 is not particularly limited. However, the frequency is preferably equal to or higher than 100 Hz and equal to or lower than 8.0 kHz, is more preferably equal to or higher than 1.0 kHz and equal to or lower than 6.0 kHz, and is further preferably equal to or higher than 2.0 kHz and equal to or lower than 3.0 kHz.

In addition, a specific resonance frequency f2 in the primary rotational vibration mode is set in accordance with f1 and f3, and is not particularly limited. However, the frequency is preferably equal to or higher than 50 Hz and equal to or lower than 4.0 kHz.

According to the angular velocity sensor 1 of the first embodiment mentioned above, the resonance frequency f2 in the rotational vibration mode is made smaller than the detuning frequency f3. Thus, when rotational vibration around the detection axis is received from the outside, it is possible to attenuate the rotational vibration in a frequency band near the detuning frequency f3.

In addition, the resonance frequency f2 in the rotational vibration mode is made larger than the width f1 of the detection frequency band. Thus, when rotational vibration around the detection axis is received from the outside, the amplification of the rotational vibration can be made small in the detection frequency band.

As described above, when rotational vibration around the detection axis is received from the outside, it is possible to suppress the fluctuation of an output even when a frequency of the rotational vibration is near the detuning frequency f3.

Second Embodiment

Next, a second embodiment of the invention will be described.

Figure 7A:
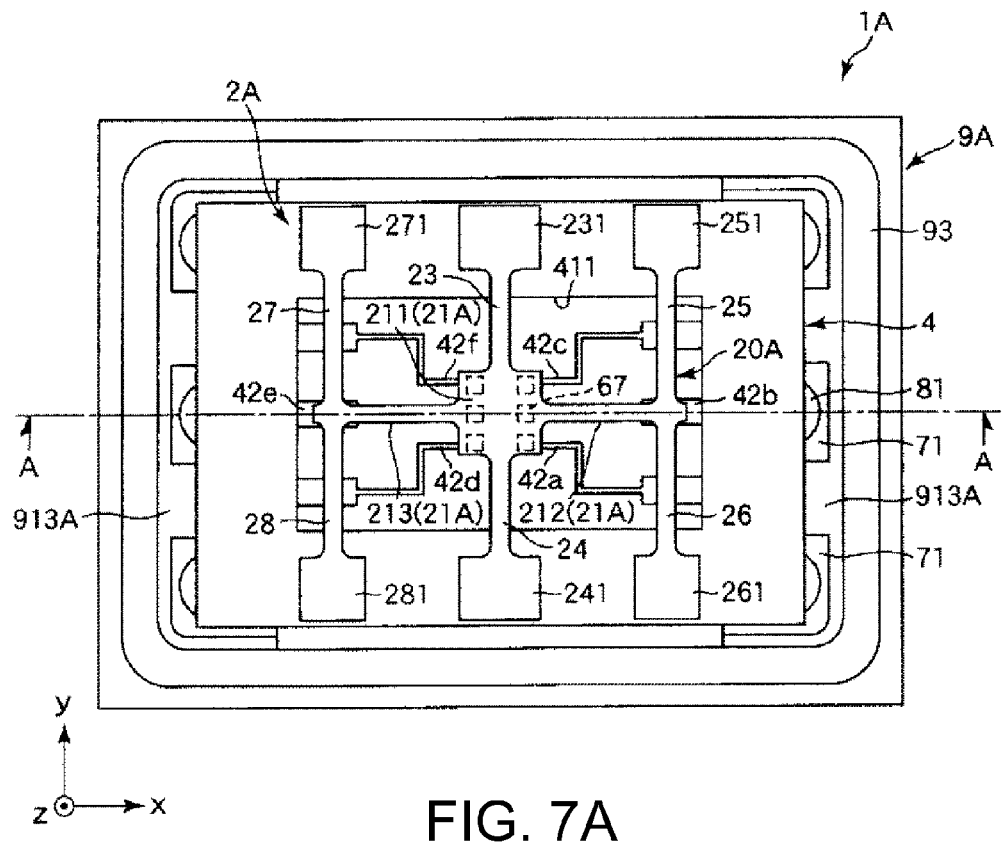
FIG. 7A is a plan view showing a schematic configuration of an angular velocity sensor according to a second embodiment of the invention.
Figure 7B:
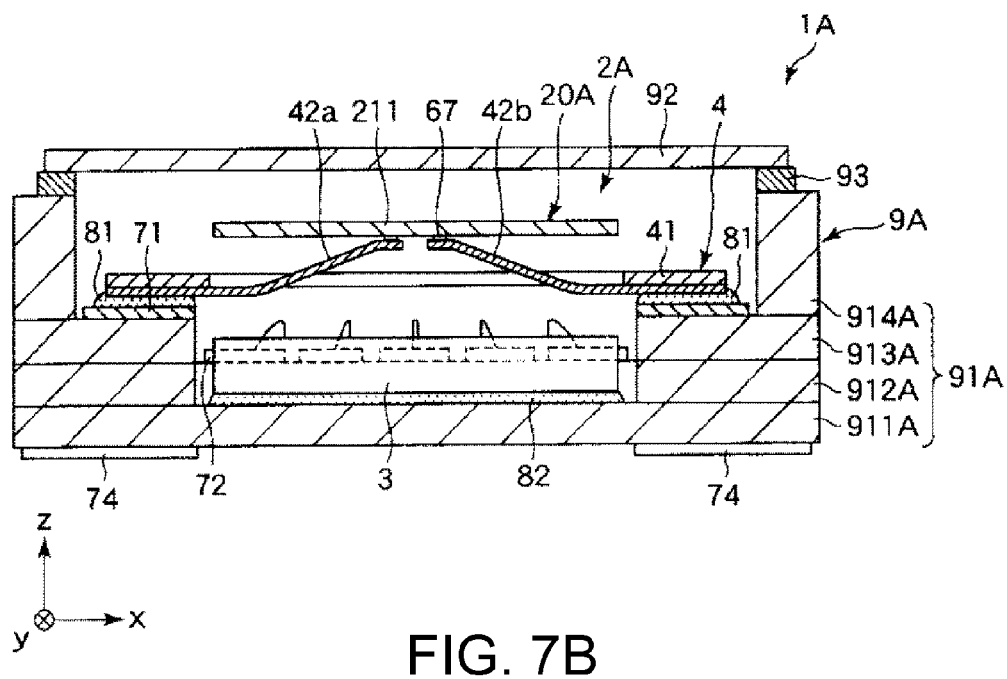
FIG. 7B is a cross-sectional view taken along line A-A in FIG. 7A.
Figure 8:
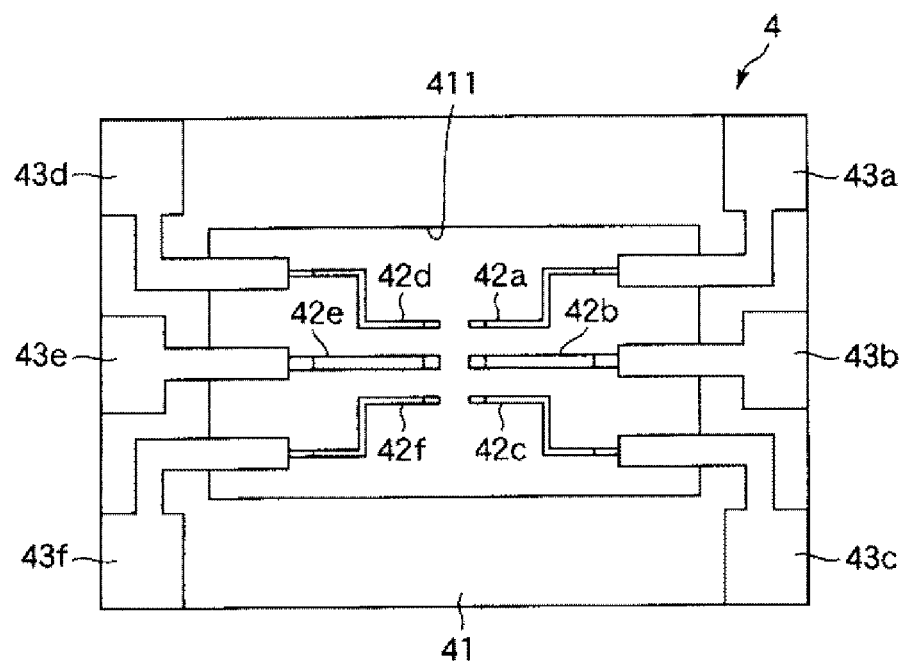
FIG. 8 is a rear view illustrating a supporting unit included in the angular velocity sensor shown in FIGS. 7A and 7B.
Figure 8:
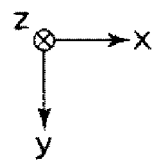

FIG. 7A is a plan view showing a schematic configuration of an angular velocity sensor according to the second embodiment of the invention, and FIG. 7B is a cross-sectional view taken along line A-A in FIG. 7A. In addition, FIG. 8 is a rear view illustrating a supporting unit included in the angular velocity sensor shown in FIGS. 7A and 7B.

Hereinafter, the second embodiment will be described focusing on the differences from the above-described embodiment, and the description of similar matters will be omitted. Meanwhile, the same components as those in the first embodiment mentioned above will be denoted by the same reference numerals and signs.

An angular velocity sensor 1A of this embodiment includes a sensor element 2A, an IC chip 3, a package 9 that accommodates the sensor element 2A and the IC chip 3, and a supporting member 4 that supports the sensor element 2A with respect to the package 9.

The sensor element 2A includes a vibrator element 20A, a plurality of detection electrodes (not shown) provided on the surface of the vibrator element 20A, a plurality of driving electrodes (not shown), and a plurality of terminals 67.

The vibrator element 20A includes a base portion 21, and two detection vibrating arms 23 and 24 and four driving vibrating arms 25 to 28 which extend from the base portion 21.

A body 211 of the base portion 21 of the vibrator element 20A is provided with a plurality of terminals 67. Similarly to the plurality of terminals 61 to 66 of the first embodiment mentioned above, the plurality of terminals 67 are electrically connected to the detection electrodes provided in the detection vibrating arms 23 and 24 and the driving electrodes provided in the driving vibrating arms 25 to 28 through wirings not shown in the drawing.

In addition, the body 211 is supported by a base 91A of a package 9A through the supporting member 4 for mounting a tape automated bonding (TAB).

The package 9A includes the base 91A having a concave portion opened to the upper surface thereof, and a lid 92 which is bonded to the base 91A through a bonding member 93 (seal ring) so as to close an opening of the concave portion of the base 91A.

The base 91A is constituted by a flat plate-shaped substrate 911A, a frame-shaped substrate 912A bonded to the top face of the substrate 911A, a frame-shaped substrate 913A bonded to the top face of the substrate 912A, and a frame-shaped substrate 914A bonded to the top face of the substrate 913A.

Such a base 91A is provided with a concave portion having level differences formed between the substrates 911A, 912A, 913A, and 914A.

The IC chip 3 is supported and fixed to the top face of the substrate 911A of the base 91A through a fixing member 82 so as to be settled in the openings of the substrates 912A and 913A.

In addition, a plurality of internal terminals 72 are provided on the top face of the substrate 912A. Further, a plurality of internal terminals 71 are provided on the top face of the substrate 913A.

The sensor element 2A is installed on the top face of the substrate 914A through the plurality of internal terminals 71 and the supporting member 4.

The supporting member 4 includes an insulating film 41 and a plurality of wirings 42a, 42b, 42c, 42d, 42e, and 42f (hereinafter, collectively referred to as "wiring 42") which are bonded onto the film 41. Here, it can be said that the film 41 constitutes a "fixing unit" fixed to the package 9A. In addition, it can be said that the wiring 42 constitutes a "supporting unit" supporting the base portion 21 with respect to the film 41. Meanwhile, it can also be said that the supporting member 4 constitutes a "supporting unit" and the package 9A or the base 91A constitutes a "fixing unit". In addition, it can be said that the body 211 of the base portion 21 constitutes a "base portion".

The film 41 is formed of a resin material such as, for example, polyimide. In addition, each of the wirings 42 is formed of a metal material such as, for example, copper.

A device hole 411 is formed in the central portion of the film 41, each of the wirings 42 extends to the device hole 411 side from above the film 41, and the extended portion is bent to the film 41 side (opposite side to the IC chip 3).

The plurality of wirings 42 are provided so as to correspond to the plurality of terminals 67 and the plurality of internal terminals 71 of the sensor element 2A mentioned above. Base end portions of the wirings 42a, 42b, 42c, 42d, 42e, and 42f are provided with connection terminals 43a, 43b, 43c, 43d, 43e, and 43f, respectively. The connection terminals are bonded to the corresponding internal terminals 71 through fixing members 81. In addition, a tip portion of each of the wirings 42 is bonded to the corresponding terminal 67. In this manner, the terminals 67 of the sensor element 2A are electrically connected to the internal terminals 71 through the wirings 42, and the sensor element 2A is supported by the base 91A through the supporting member 4.

Also in the angular velocity sensor 1A configured in the above-described manner, the body 211 (base portion) is supported by the package 9A through the plurality of wirings 42, and thus the body 211 may rotate around the z-axis (detection axis) with respect to the package 9A in association with the elastic deformation of the plurality of wirings 42.

Therefore, also in the angular velocity sensor 1A, when a width of a detection frequency band is set to f1 [Hz], a resonance frequency in a rotational vibration mode around the detection axis of the base portion 21 with respect to the film 41 is set to f2 [Hz], and a detuning frequency is set to f3 [Hz], the relation of f1<f2<f3 is satisfied. Thus, even when rotational vibration around the detection axis is received, it is possible to suppress the fluctuation of an output due to the rotational vibration.

Third Embodiment

Next, a third embodiment of the invention will be described.

Figure 9:
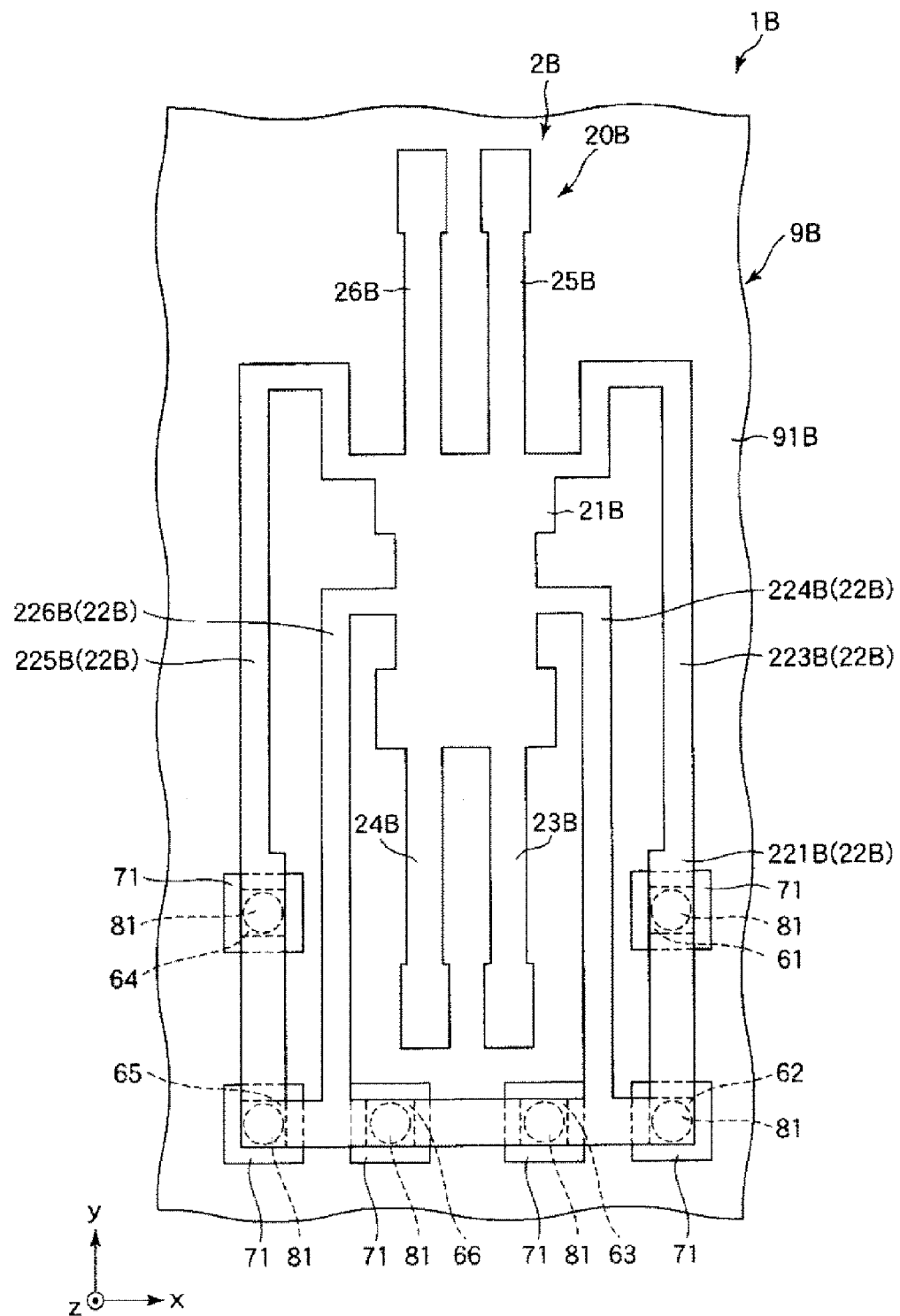
FIG. 9 is a plan view showing a schematic configuration of an angular velocity sensor according to a third embodiment of the invention.
Figure 10:
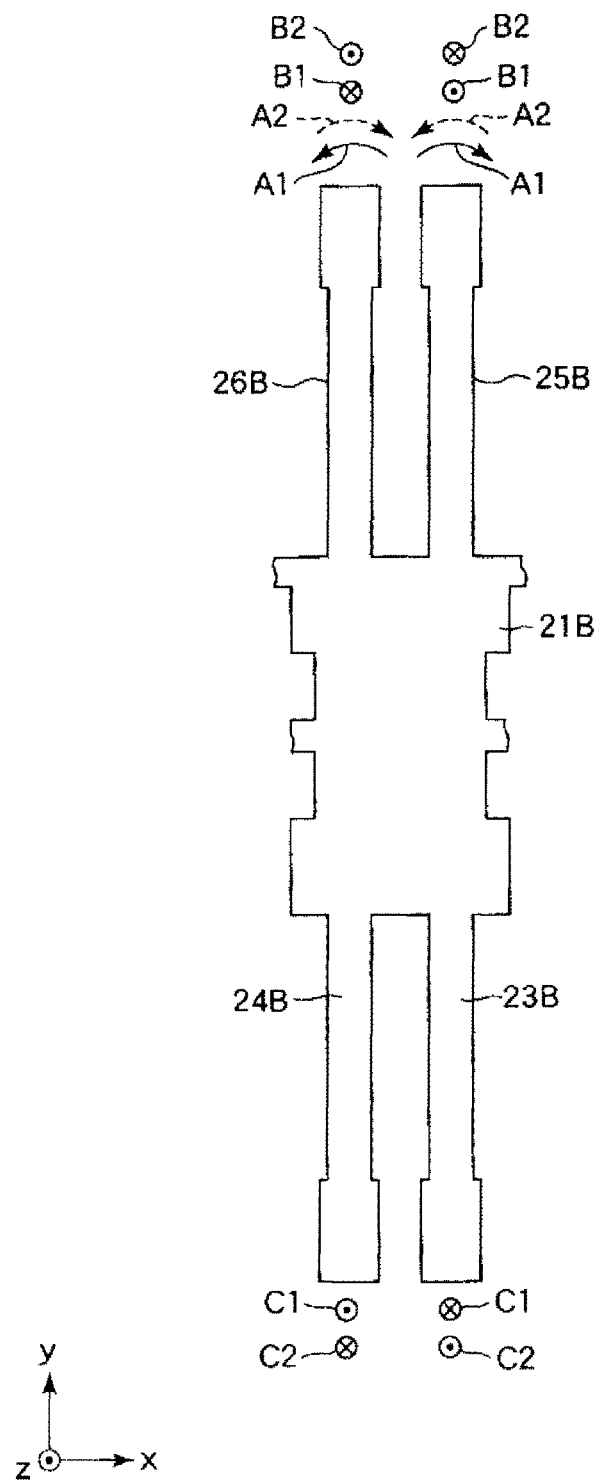
FIG. 10 is a plan view illustrating the operation of a sensor element included in the angular velocity sensor shown in FIGS. 11A and 11B.
Figure 11A:
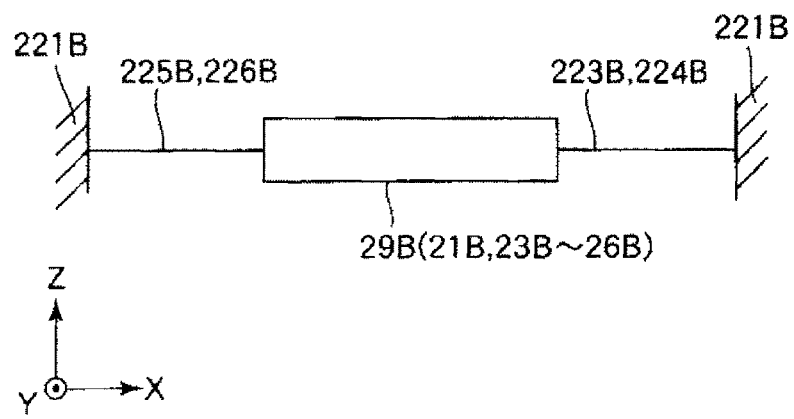
FIG. 11A is a diagram showing a simplified model of the angular velocity sensor shown in FIG. 10.
Figure 11B:
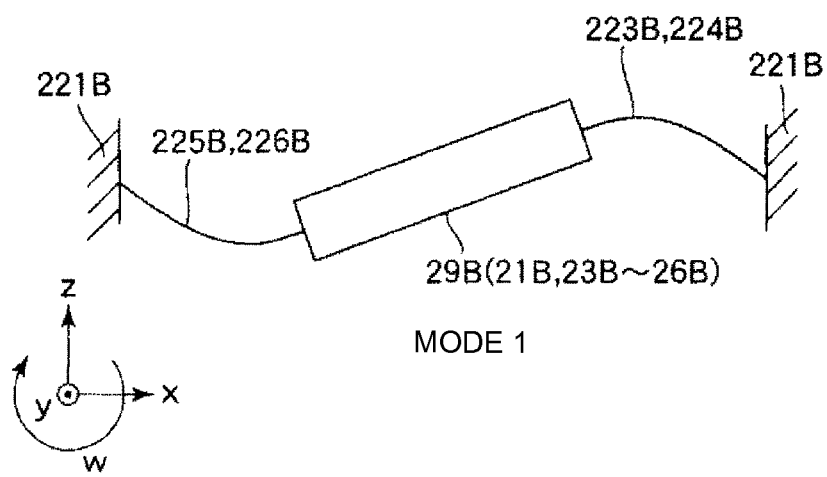
FIG. 11B is a diagram showing a primary rotational vibration mode (mode 1).
Figure 12:
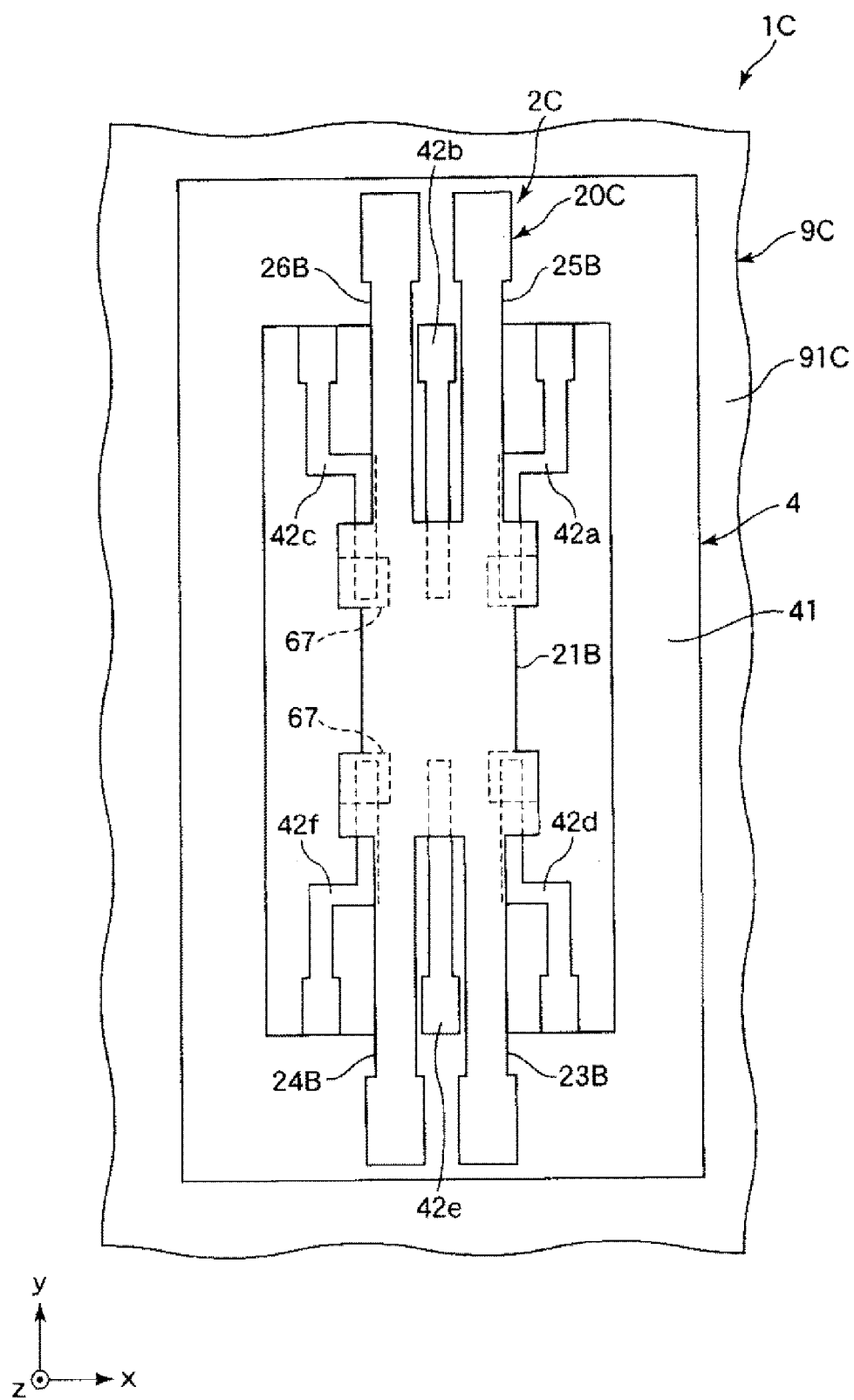
FIG. 12 is a plan view showing a schematic configuration of an angular velocity sensor according to a fourth embodiment of the invention.

FIG. 9 is a plan view showing a schematic configuration of an angular velocity sensor according to the third embodiment of the invention. FIG. 10 is a plan view illustrating the operation of a sensor element included in the angular velocity sensor shown in FIG. 9. In addition, FIG. 11A is a diagram showing a simplified model related to the rotational vibration of the angular velocity sensor shown in FIG. 12, and FIG. 11B is a diagram showing a primary rotational vibration mode (mode 1) around a detection axis.

Hereinafter, the third embodiment will be described focusing on the differences from the above-described embodiments, and the description of similar matters will be omitted. Meanwhile, the same components as those in the first embodiment mentioned above will be denoted by the same reference numerals and signs.

An angular velocity sensor 1B of this embodiment includes a sensor element 2B, an IC chip (not shown), and a package 9B that accommodates the sensor element 2B and the IC chip.

The sensor element 2B is an "in-plane detection type" sensor element that detects an angular velocity around a y-axis. As shown in FIG. 9, the sensor element 2B includes a vibrator element 20B, and a plurality of detection electrodes (not shown), a plurality of driving electrodes (not shown) and a plurality of terminals 61 to 66 which are provided on the surface of the vibrator element 20B.

The vibrator element 20B includes a base portion 21B, a pair of driving vibrating arms 25B and 26B, a pair of detection vibrating arms 23B and 24B, and a supporting unit 22B.

The base portion 21B is supported by the supporting unit 22B. The supporting unit 22B includes a fixing unit 221B, and four connecting units 223B, 224B, 225B, and 226B that support the base portion 21B with respect to the fixing unit 221B. The four connecting units 223B, 224B, 225B, and 226B have a long shape. One end of each of the connecting units is connected to the base portion 21B, and the other end thereof is connected to the fixing unit 221B. Here, it can be said that the connecting units 223B, 224B, 225B, and 226B constitute a "supporting unit" supporting the base portion 21B with respect to the fixing unit 221B. Meanwhile, it can also be said that the supporting unit 22B constitutes a "supporting unit" and the package 9B or a base 91B of the package 9B constitutes a "fixing unit".

The driving vibrating arms 25B and 26B extend from the base portion 21B in a y-axis direction (+y direction). Although not shown in the drawing, each of the driving vibrating arms 25B and 26B is provided with a pair of driving electrodes (a driving signal electrode and a driving ground electrode) which bend and vibrate the driving vibrating arms 25B and 26B in an x-axis direction by electrification, similar to the driving vibrating arms 25 and 26 of the first embodiment mentioned above. The pair of driving electrodes provided in each of the driving vibrating arms 25B and 26B are electrically connected to the terminal 61 (driving signal terminal) and the terminal 64 (driving ground terminal) which are provided in the fixing unit 221B through wirings not shown in the drawing.

The detection vibrating arms 23B and 24B extend from the base portion 21B in the y-axis direction (−y direction). Although not shown in the drawing, the detection vibrating arm 23B is provided with a pair of detection electrodes (a detection signal electrode and a detection ground electrode) which detect charge generated in association with the bending vibration of the detection vibrating arms 23B and 24B in a z-axis direction. The pair of detection electrodes provided in the detection vibrating arm 23B are electrically connected to the terminal 62 (detection ground terminal) and the terminal 63 (detection signal terminal) which are provided in the fixing unit 221B through wirings not shown in the drawing. Similarly, the pair of detection electrodes provided in the detection vibrating arm 24B are electrically connected to the terminal 65 (detection ground terminal) and the terminal 66 (detection signal terminal) through wirings not shown in the drawing.

In the sensor element 2B configured in this manner, a driving signal is applied between the terminal 61 and the terminal 64. Thus, as shown in FIG. 10, the driving vibrating arm 25B and the driving vibrating arm 26B are bent and vibrated (driving vibration) so as to approach and separate from each other. That is, a state where the driving vibrating arms 25B and 26B are bent in a direction of an arrow A1 shown in FIG. 10 and a state where the driving vibrating arms 25B and 26B are bent in a direction of an arrow A2 shown in FIG. 10 are alternately repeated.

In this manner, when an angular velocity ω around the y-axis is applied to the sensor element 2B in a state where the driving vibrating arms 25B and 26B are driven and vibrated, the driving vibrating arms 25B and 26B are bent and vibrated to the opposite sides in the z-axis direction by a Coriolis force. That is, a state where the driving vibrating arms 25B and 26B are bent in a direction of an arrow B1 shown in FIG. 10 and a state where the driving vibrating arms 25B and 26B are bent in a direction of an arrow AB shown in FIG. 10 are alternately repeated. Consequently, the detection vibrating arms 23B and 24B are bent and vibrated (detection vibration) to the opposite sides in the z-axis direction. That is, a state where the detection vibrating arms 23B and 24B are bent in a direction of an arrow C1 shown in FIG. 10 and a state where the detection vibrating arms 23B and 24B are bent in a direction of an arrow C2 shown in FIG. 10 are alternately repeated.

Charge generated between the pair of detection electrodes by the bending vibration of the detection vibrating arm 23B is output from the terminals 62 and 63. In addition, charge generated between the pair of detection electrodes by the bending vibration of the detection vibrating arm 24B is output from the terminals 65 and 66.

In this manner, it is possible to obtain the angular velocity ω applied to the sensor element 2B on the basis of the charge output from the terminals 62, 63, 65, and 66.

Such a sensor element 2B is accommodated in the package 9B. Here, the terminals 61 to 66 are bonded to internal terminals 71, which are provided on the base 91B included in the package 9B, through fixing members 81. Thus, the sensor element 2B is supported and fixed to the package 9B, and the internal terminals 71 and the terminals 61 to 66 are electrically connected to each other.

In the angular velocity sensor 1B configured in the above-described manner, the base portion 21B is supported by the package 9B through the connecting units 223B, 224B, 225B, and 226B, and thus the base portion 21B may rotate around the y-axis (detection axis) with respect to the package 9B in association with the elastic deformation of the connecting units 223B, 224B, 225B, and 226B.

Specifically, in the angular velocity sensor 1B configured in the above-described manner, a mass 29B constituted by the base portion 21B, the detection vibrating arms 23B and 24B, and the driving vibrating arms 25B and 26B can be regarded as a vibration system supported by the fixing unit 221B through the connecting units 223B, 224B, 225B, and 226B which are springs (elastic bodies), as shown in FIG. 11A.

Such a vibration system has a "primary rotational vibration mode" which is a basic mode in which the mass 29B rotates and vibrates around the detection axis in association with the primary bending of the connecting units 223B, 224B, 225B, and 226B as shown in FIG. 11B, as a rotational vibration mode around the detection axis.

Therefore, also in the angular velocity sensor 1B, when a width of a detection frequency band is set to f1 [Hz], a resonance frequency in a rotational vibration mode around the detection axis of the base portion 21B with respect to the fixing unit 221B is set to f2 [Hz], and a detuning frequency is set to f3 [Hz], the relation of f1<f2<f3 is satisfied. Thus, even when rotational vibration around the detection axis is received, it is possible to suppress the fluctuation of an output due to the rotational vibration.

Fourth Embodiment

Next, a fourth embodiment of the invention will be described.

FIG. 12 is a plan view showing a schematic configuration of an angular velocity sensor according to the fourth embodiment of the invention.

Hereinafter, the fourth embodiment will be described focusing on the differences from the above-described embodiments, and the description of similar matters will be omitted. Meanwhile, the same components as those in the first embodiment mentioned above will be denoted by the same reference numerals and signs.

An angular velocity sensor 1C of this embodiment includes a sensor element 2C, an IC chip (not shown), a package 9C that accommodates the sensor element 2C and the IC chip, and a supporting member 4 that supports the sensor element 2C with respect to the package 9C.

The sensor element 2C includes a vibrator element 20C, and a plurality of detection electrodes (not shown), a plurality of driving electrodes (not shown), and plurality of terminals 67 which are provided on the surface of the vibrator element 20C.

The vibrator element 20C includes a base portion 21B, and two detection vibrating arms 23B and 24B and two driving vibrating arms 25B and 26B which extend from the base portion 21B.

The base portion 21B of the vibrator element 20C is provided with a plurality of terminals 67.

In addition, the base portion 21B is supported by a base 91C of the package 9C through the supporting member 4 for mounting a tape automated bonding (TAB). Here, it can be said that a film 41 of the supporting member 4 constitutes a "fixing unit" fixed to the package 9C. In addition, it can be said that a wiring 42 constitutes a "supporting unit" supporting the base portion 21B with respect to the film 41. Meanwhile, it can also be said that the supporting member 4 constitutes a "supporting unit" and the package 9C or the base 91C constitutes a "fixing unit". In addition, it can be said that a body 211 of the base portion 21B mentioned above constitutes a "base portion".

Also in the angular velocity sensor 1C configured in the above-described manner, the base portion 21B is supported by the package 9C through the plurality of wirings 42, and thus the base portion 21B may rotate around the y-axis (detection axis) with respect to the package 9C in association with the elastic deformation of the plurality of wirings 42.

Therefore, also in the angular velocity sensor 1C, when a width of a detection frequency band is set to f1 [Hz], a resonance frequency in a rotational vibration mode around the detection axis of the base portion 21C with respect to the film 41 is set to f2 [Hz], and a detuning frequency is set to f3 [Hz], the relation of f1<f2<f3 is satisfied. Thus, even when rotational vibration around the detection axis is received, it is possible to suppress the fluctuation of an output due to the rotational vibration.

2. Electronic Apparatus

The above-described angular velocity sensor is embedded in various types of electronic apparatuses, and thus it is possible to provide an electronic apparatus having excellent reliability.

Figure 13:
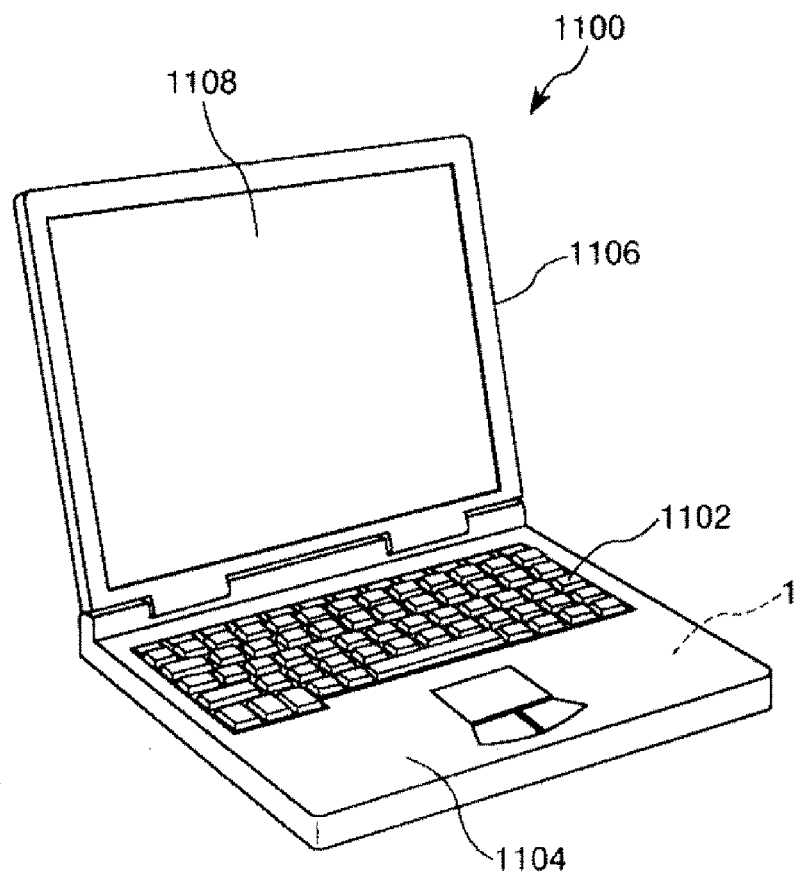
FIG. 13 is a perspective view showing an example of a mobile (or notebook) personal computer to which an electronic apparatus according to the invention is applied.

FIG. 13 is a perspective view showing an example of a mobile (or notebook) personal computer to which an electronic apparatus according to the invention is applied.

In this diagram, a personal computer 1100 is configured to include a main body 1104 having a keyboard 1102 and a display unit 1106 having a display portion 100, and the display unit 1106 is supported so as to be rotatable with respect to the main body 1104 through a hinge structure.

The above-described angular velocity sensor 1 functioning as a gyro sensor is incorporated in the personal computer 1100.

Figure 14:
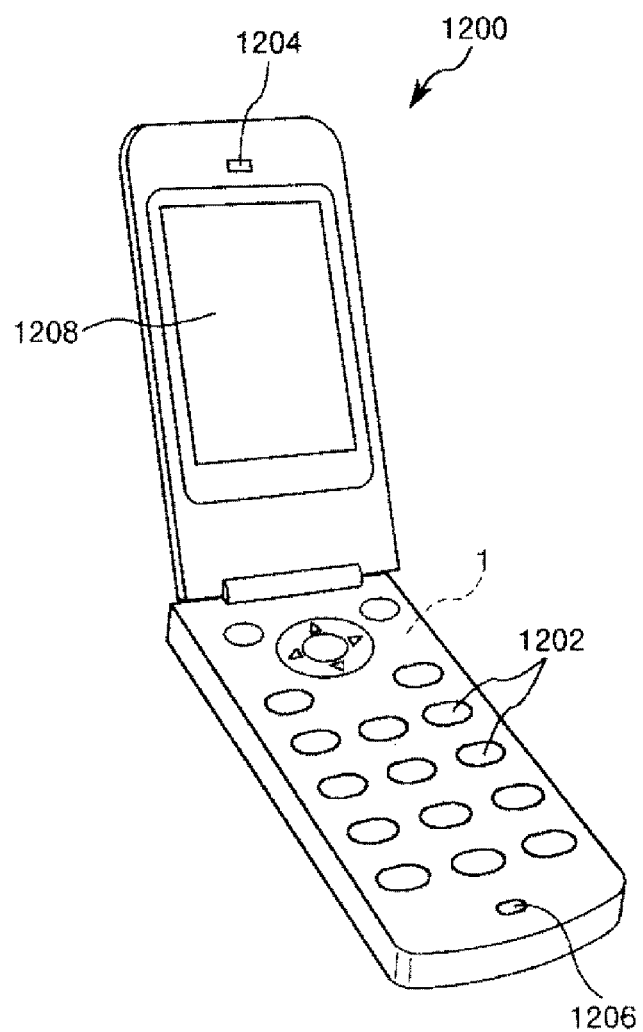
FIG. 14 is a perspective view showing an example of a mobile phone (a PHS is also included) to which an electronic apparatus according to the invention is applied.

FIG. 14 is a perspective view showing an example of a mobile phone (a PHS is also included) to which an electronic apparatus according to the invention is applied.

In this diagram, a mobile phone 1200 includes a plurality of operation buttons 1202, an earpiece 1204, and a mouthpiece 1206, and the display portion 100 is disposed between the operation buttons 1202 and the earpiece 1204.

The above-described angular velocity sensor 1 functioning as a gyro sensor is incorporated in the mobile phone 1200.

Figure 15:
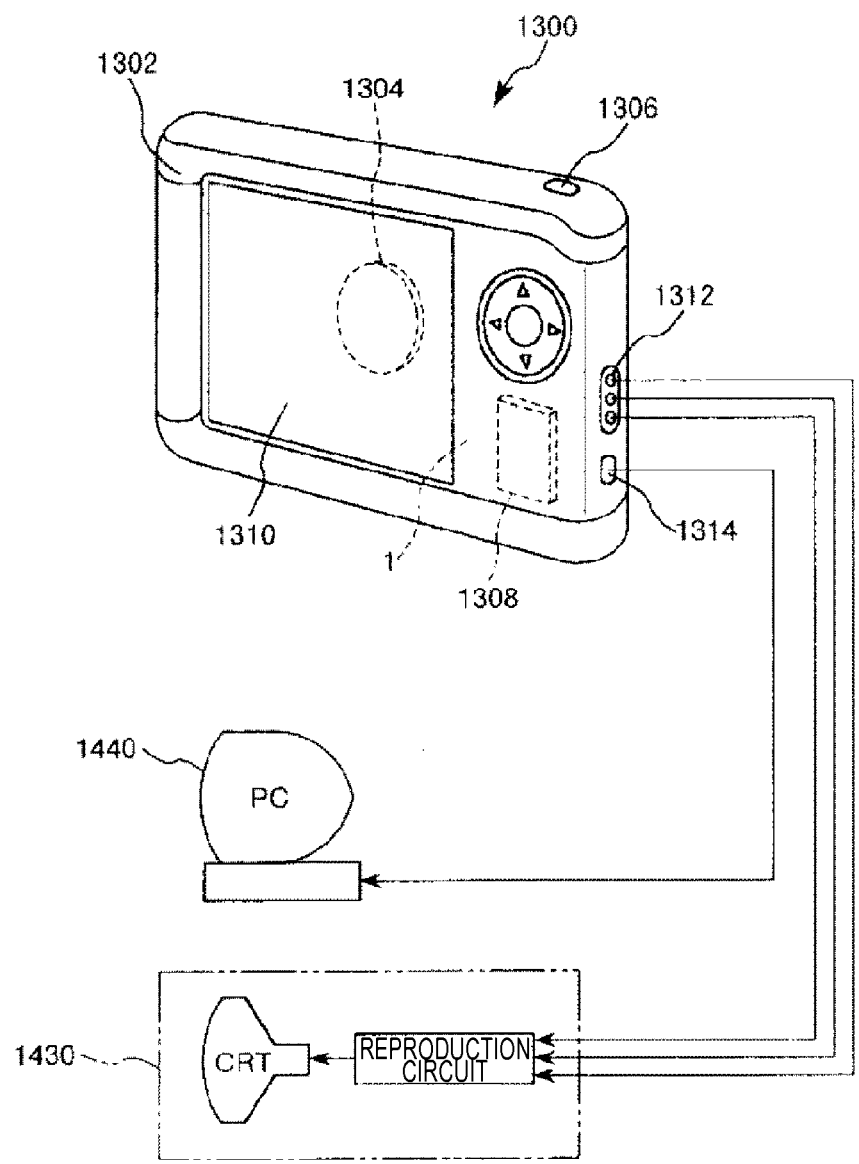
FIG. 15 is a perspective view showing an example of a digital still camera to which an electronic apparatus according to the invention is applied.

FIG. 15 is a perspective view showing an example of a digital still camera to which an electronic apparatus according to the invention is applied. Meanwhile, connection with an external device is simply shown in this diagram.

Here, a silver halide photograph film is exposed to light according to an optical image of a subject in a typical camera, while a digital still camera 1300 generates an imaging signal (image signal) by performing photoelectric conversion of an optical image of a subject using an imaging element, such as a charge coupled device (CCD).

A display portion is provided on the back of a case (body) 1302 in the digital still camera 1300, so that display based on the imaging signal of the CCD is performed. The display portion functions as a viewfinder that displays a subject as an electronic image.

In addition, a light receiving unit 1304 including an optical lens (imaging optical system), a CCD, and the like is provided on the front side (back side in FIG. 15) of the case 1302.

When a photographer checks a subject image displayed on the display unit and presses a shutter button 1306, an imaging signal of the CCD at that point in time is transferred and stored in a memory 1308.

In addition, in the digital still camera 1300, a video signal output terminal 1312 and an input/output terminal for data communication 1314 are provided on the side surface of the case 1302. In addition, as shown in FIG. 15, a television monitor 1430 is connected to the video signal output terminal 1312 and a personal computer 1440 is connected to the input/output terminal for data communication 1314 when necessary. In addition, an imaging signal stored in the memory 1308 may be output to the television monitor 1430 or the personal computer 1440 by a predetermined operation.

The above-described angular velocity sensor 1 functioning as a gyro sensor is incorporated in the digital still camera 1300.

Meanwhile, the electronic apparatus according to the invention can be applied not only to the personal computer (mobile personal computer) of FIG. 13, the mobile phone of FIG. 14, and the digital still camera of FIG. 15 but also to, for example, a car body posture detecting apparatus, pointing device, head-mounted display, ink jet type discharge apparatus (for example, an ink jet printer), a laptop type personal computer, a television, a video camera, a video tape recorder, a navigation apparatus, a pager, an electronic organizer (an electronic organizer with a communication function is also included), an electronic dictionary, an electronic calculator, an electronic game machine, a game controller, a word processor, a workstation, a video phone, a television monitor for security, electronic binoculars, a POS terminal, medical equipment (for example, an electronic thermometer, a sphygmomanometer, a blood sugar meter, an electrocardiographic measurement device, an ultrasonic diagnostic apparatus, and an electronic endoscope), a fish detector, various measurement apparatuses, instruments (for example, instruments for vehicles, aircraft, and ships), a flight simulator, and the like, according to the type of an electronic device.

3. Moving Object

Figure 16:
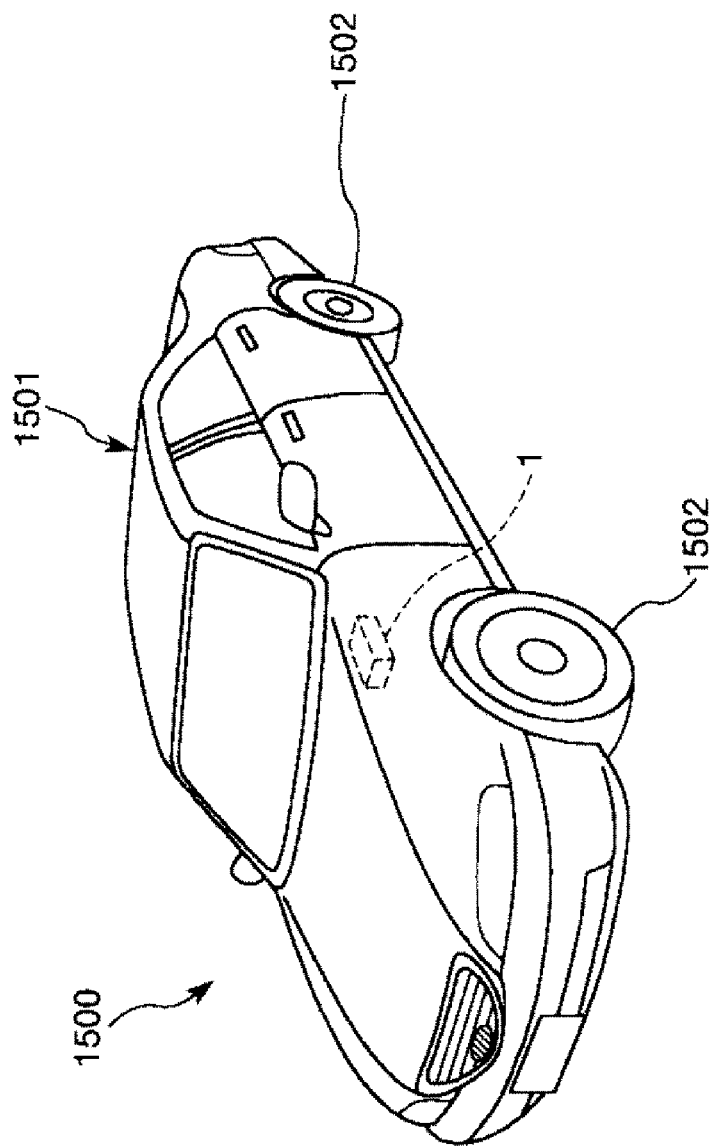
FIG. 16 is a perspective view showing an example of a moving object (vehicle) according to the invention.

FIG. 16 is a perspective view showing an example of a moving object (vehicle) according to the invention. In this diagram, a moving object 1500 includes a car body 1501 and four wheels 1502, and is configured to rotate the wheels 1502 using a power source (engine), not shown in the drawing, which is provided in the car body 1501. An angular velocity sensor 10 (angular velocity sensor 1) is incorporated in the moving object 1500.

According to such a moving object, it is possible to exhibit excellent reliability.

The angular velocity sensor, the electronic apparatus, and the moving object according to the invention have been described so far on the basis of the embodiments shown in the drawings. However, the invention is not limited thereto, and the configuration of each portion can be replaced with any configuration having the same function. In addition, any other component may be added. Further, the angular velocity sensor according to the invention may be a combination of the configurations (characteristics) of any two or more of the above embodiments.

In the above-described embodiments, a description has been made of an example of a case where primary and secondary rotational vibration modes are used as rotational vibration attenuation modes. However, the invention is not limited thereto, and one or two or more of other (secondary, tertiary, and the like) rotational vibration modes around a detection axis of a base portion can also be combined and used as rotational vibration attenuation modes.

In the above-described embodiments, a description has been made of an example in which a sensor element includes four or two driving vibrating arms and two detection vibrating arms. However, the invention is not limited thereto, and the number of driving vibrating arms may be equal to or greater than one, three, or five and the number of detection vibrating arms may be equal to or greater than one or three.

In the above-described embodiments, a description has been made of an example of a case where a vibrator element of a sensor element is formed of a piezoelectric material. However, the vibrator element of the sensor element may be formed of a non-piezoelectric material such as silicon or quartz. In this case, for example, a piezoelectric element may be provided on a driving vibrating arm and a detection vibrating arm. In this case, when the vibrator element is formed of silicon, it is possible to realize the vibrator element having excellent vibration characteristics at a relatively low cost. In addition, it is possible to form the vibrator element with high dimensional accuracy through etching using well-known fine processing technology. For this reason, it is possible to achieve the miniaturization of the vibrator element.

In the above-described embodiment, a description has been made of an example of a case where a piezoelectric driving method using an inverse piezoelectric effect is used as a driving method of a driving unit, but the invention is not limited thereto. For example, an electrostatic driving method using electrostatic attraction and an electromagnetic driving method using an electromagnetic force can be used. Similarly, in the above-described embodiments, a description has been made of an example of a case where a piezoelectric detection method using a piezoelectric effect is used as a detection method of a detection unit, but the invention is not limited thereto. For example, a capacitance detection method of detecting capacitance, a piezoresistance detection method of detecting a resistance value of piezoresistance, an electromagnetic detection method of detecting an electromotive force, and an optical detection method can be used. In addition, any combination of the above-described methods can be used as the driving method of the driving unit and the detection method of the detection unit.

In the above-described embodiments, a description has been made of an example of a case where the detection unit is provided separately from the driving unit, but the invention is not limited thereto. The driving unit may double as the detection unit.

In the above-described embodiments, a description has been made of an example of a case where the driving unit and the detection unit have an arm shape, but the invention is not limited thereto. For example, when an electrostatic driving method and a capacitance detection method are used, the driving unit and the detection unit may have a portion having a plate shape, a comb shape, or the like.

The entire disclosure of Japanese Patent Application No. 2013-226532, filed Oct. 31, 2013 is expressly incorporated by reference herein.

What is claimed is:

1. An angular velocity sensor comprising:
   a fixing unit;
   a base portion;
   a supporting unit that supports the base portion with respect to the fixing unit;
   a vibration unit that is connected to the base portion;
   a detection unit that is connected to the base portion and vibrates by an action of a Coriolis force based on an angular velocity around a detection axis; and
   a detection circuit electrically connected to the detection unit,
   wherein a width of a detection frequency band of the detection circuit is f1 Hz,
   a detuning frequency corresponding to a difference between a resonance frequency of the vibration unit and a resonance frequency of the detection unit is tuned to f3 Hz,
   the supporting unit includes a plurality of beams each having a respective bending portion, and
   a resonance frequency f2 Hz in a rotational vibration mode in which a mass constituted by the base portion, the vibration unit, and the detection unit rotationally vibrates around the detection axis with respect to the fixing unit in association with deformation of the supporting unit is greater than f1 and is less than f3 Hz.

2. The angular velocity sensor according to claim 1, wherein the rotational vibration mode is a primary rotational vibration mode.

3. The angular velocity sensor according to claim 2, wherein a relation of 1.4≤(f3/f2) is satisfied.

4. An electronic apparatus comprising the angular velocity sensor according to claim 3.

5. A moving object comprising the angular velocity sensor according to claim 3.

6. The angular velocity sensor according to claim 2, wherein a relation of (f3/f2)≤4 is satisfied.

7. An electronic apparatus comprising the angular velocity sensor according to claim 6.

8. A moving object comprising the angular velocity sensor according to claim 6.

9. The angular velocity sensor according to claim 2, wherein a Q value in the primary rotational vibration mode is equal to or greater than 5 and equal to or less than 100.

10. An electronic apparatus comprising the angular velocity sensor according to claim 9.

11. A moving object comprising the angular velocity sensor according to claim 9.

12. The angular velocity sensor according to claim 2, wherein a relation of $(f1/f2) \leq 0.5$ is satisfied.

13. An electronic apparatus comprising the angular velocity sensor according to claim 12.

14. A moving object comprising the angular velocity sensor according to claim 12.

15. An electronic apparatus comprising the angular velocity sensor according to claim 2.

16. A moving object comprising the angular velocity sensor according to claim 2.

17. An electronic apparatus comprising the angular velocity sensor according to claim 1.

18. A moving object comprising the angular velocity sensor according to claim 1.

* * * * *